(12) United States Patent
Folkenberg et al.

(10) Patent No.: US 7,289,709 B2
(45) Date of Patent: Oct. 30, 2007

(54) PHOTONIC CRYSTAL FIBRES COMPRISING STRESS ELEMENTS

(75) Inventors: Jacob Riis Folkenberg, Kokkedal (DK); Martin Dybendal Nielsen, Kgs. Lyngby (DK); Niels Asger Mortensen, Kgs. Lyngby (DK)

(73) Assignee: Crystal Fibre A/S, Birkerod (DK)

( * ) Notice: Subject to any disclaimer, the term of this patent is extended or adjusted under 35 U.S.C. 154(b) by 0 days.

(21) Appl. No.: 11/454,798

(22) Filed: Jun. 19, 2006

(65) Prior Publication Data

US 2006/0291789 A1    Dec. 28, 2006

Related U.S. Application Data

(63) Continuation-in-part of application No. PCT/EP2004/53601, filed on Dec. 20, 2004.

(60) Provisional application No. 60/530,607, filed on Dec. 19, 2003.

(30) Foreign Application Priority Data

| Jun. 23, 2004 | (DK) | ................................ 2004 00979 |
| Nov. 15, 2004 | (DK) | ................................ 2004 01766 |

(51) Int. Cl.
*G02B 6/02* (2006.01)
*G02B 6/036* (2006.01)
*G02B 6/00* (2006.01)
*G02B 6/028* (2006.01)
*G02B 6/032* (2006.01)

(52) U.S. Cl. .................. 385/126; 385/11; 385/122; 385/123; 385/124; 385/125; 385/127; 385/128

(58) Field of Classification Search .................. 385/11, 385/122–128
See application file for complete search history.

(56) References Cited

U.S. PATENT DOCUMENTS 5,841,131 A    11/1998   Schroeder et al.
6,954,574 B1 *  10/2005  Russell et al. .............. 385/125

FOREIGN PATENT DOCUMENTS

EP        1 345 069 A2    9/2003

(Continued)

OTHER PUBLICATIONS

Hansen et al., "Highly Birefringent Index-Guiding Photonic Crystal Fibers", IEEE Photonics Technology Letters, vol. 13, No. 6, Jun. 2001, pp. 588-590.

(Continued)

*Primary Examiner*—Frank G. Font
*Assistant Examiner*—Jerry Martin Blevins
(74) *Attorney, Agent, or Firm*—Buchanan Ingersoll & Rooney PC

(57) ABSTRACT

A photonic crystal fiber includes a core region for propagating light in a longitudinal direction of the fiber, a cladding region surrounding the core region, the cladding region including micro-structural elements extending in the longitudinal direction. The cladding region further includes at least one stress element having a coefficient of thermal expansion $\alpha_{T,SAP}$ and extending in the longitudinal direction of the photonic crystal fiber, the stress element(s) being located in a cladding background material having a coefficient of thermal expansion $\alpha_{T,cladback}$ different from $\alpha_{T,SAP}$. The location of the at least one stress element relative to the core region and the micro-structural elements and the coefficients of thermal expansion $\alpha_{T,SAP}$ and $\alpha_{T,cladback}$ are adapted to provide a stress induced birefringence in the core region of the photonic crystal fiber. An article includes a photonic crystal fiber, a method of manufacturing and the use of a photonic crystal fiber are furthermore provided.

21 Claims, 22 Drawing Sheets

FOREIGN PATENT DOCUMENTS

| WO | 00/37974 | 6/2000 |
| WO | 00/49436 | 8/2000 |
| WO | 03/100488 A1 | 12/2003 |

OTHER PUBLICATIONS

Ortigosa-Blanch et al., "Highly birefringent photonic crystal fibers", Optics Letters, Vo;. 25, No. 18, Sep. 15, 2000, pp. 1325-1327.

Broeng et al., "Photonic Crystal Fibers: A New Class of Optical Waveguides", Optical Fiber Technology, vol. 5, 1999, pp. 305-330.

Bjarklev et al., "Photonic Crystal Fibers", Kluwer Academic Press, Chapter 4, 2003, pp. 115-130.

Folkenberg et al., "Experimental investigation of cut-off phenomena in non-linear photonic crystal fibers", Optics Letters, vol. 28, No. 20, 2003, pp. 1882-1884.

Mortensen et al., "Improved large-mode area endlessly single-mode photonic crystal fibers", Optics Letters, vol. 28, No. 6, 2003, pp. 393-395.

Mortensen et al., "Modal cut-off and the V-parameter in photonic crystal fibers", Optics Letters, vol. 28, No. 20, 2003, pp. 1879-1881.

Noda et al., "Polarization-Maintaining Fibers and Their Applications", Journal of Lightwave Technology, Vo. LT-4, No. 8, Aug. 8, 1986, pp. 1071-1089.

Chu et al., "Analytical Method for Calculation of Stresses and Material Birefringence in Polarization-Maintaining Optical Fiber", Journal of Lightwave Technology, vol. LT-2, No. 5, Oct. 1984, pp. 650-662.

Folkenberg et al., "Polarization maintaining large mode area photonic crystal fiber", Opt. Express, vol. 12, No. 5, 2004, pp. 956-960.

* cited by examiner

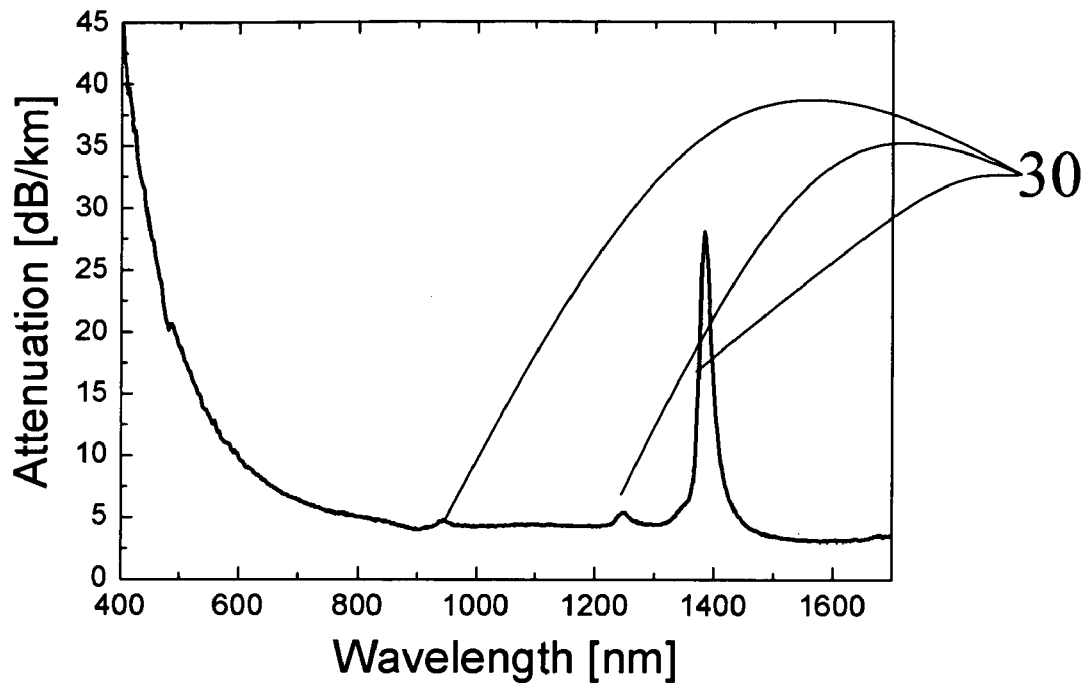
Fig. 3
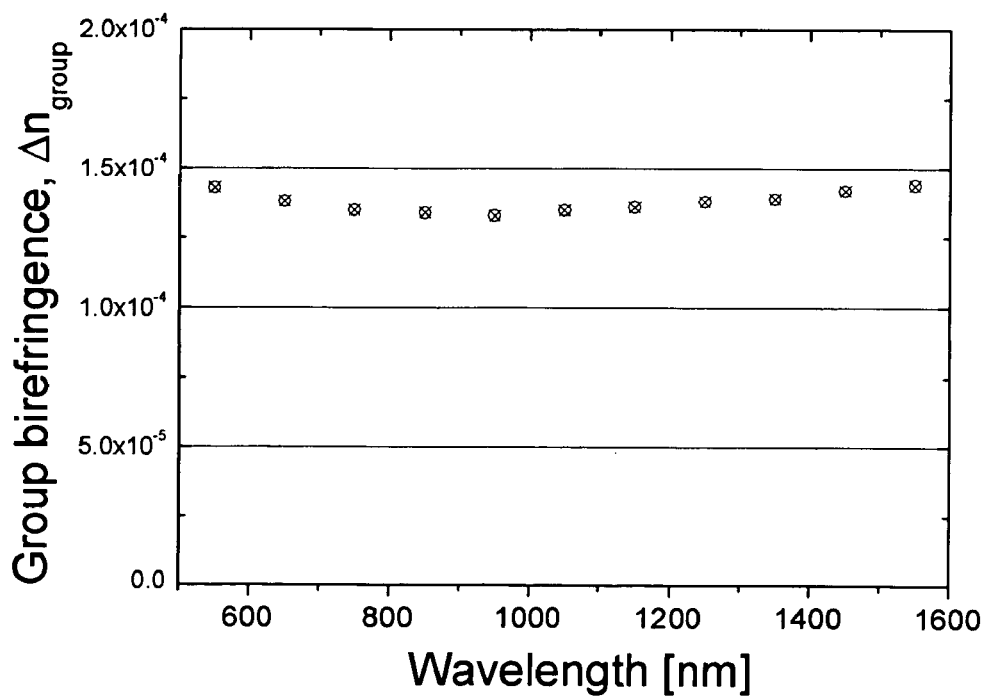

PHOTONIC CRYSTAL FIBRES COMPRISING STRESS ELEMENTS

CROSS-REFERENCE TO RELATED APPLICATIONS

The present application is a continuation-in-part of PCT/EP2004/053601 filed Dec. 20, 2004, and claims the priority of Danish patent applications PA 2004 00979, filed Jun. 23, 2004, and PA 2004 01766, filed Nov. 15, 2004, and which further claims the benefit of U.S. provisional application 60/530,607, filed on Dec. 19, 2003.

TECHNICAL FIELD

The invention relates to stress induced birefringence in photonic crystal fibres. The invention relates specifically to a photonic crystal fibre comprising a core region for propagating light in a longitudinal direction of said photonic crystal fibre, a cladding region surrounding said core region, said cladding region comprising micro-structural elements extending in said longitudinal direction.

The invention furthermore relates to a preform for fabricating a photonic crystal fibre, an article comprising a photonic crystal fibre, and to the use of a photonic crystal fibre.

The invention may e.g. be useful in applications such as polarization maintaining or polarizing fibres, fibre amplifiers or lasers.

BACKGROUND ART

Photonic crystal fibres have in recent years proved a very valuable technology. There is, however, a need for photonic crystal fibres that may provide relatively large core sizes and relatively strong birefringence. Present photonic crystal fibres may provide strong birefringence, but have relatively small core sizes (see e.g. Hansen et al., IEEE Phot. Tech. Lett., 13, 6, 2001; Ortigosa-Blanch Opt. Lett., 25, 18, 2000). The small core size makes the fibres difficult to work with (for example difficult to couple light to them). The small core further limits the power handling capacities of the fibres. The present birefringent fibres have furthermore strongly wavelength dependent birefringence that may limit the use of the fibres.

WO-00/49436 describes a photonic crystal fibre comprising a bulk material having an arrangement of longitudinal holes and a guiding core, wherein the fibre has at-most-two-fold rotational symmetry about a longitudinal axis and as a result of that lack of symmetry, the fibre is birefringent. It is stated that the methods used to produce birefringence in standard fibres, and thus to produce standard polarisation-preserving fibres, are, in general, not directly suitable for use in photonic-crystal fibre. The same conclusion is drawn in the article by Ortigosa-Blanch et al. "Highly birefringent photonic crystal fibres", Optics Letters, Vol. 25, No. 18, 15 Sep. 2000, pp. 1325-1327, where it is stated that a holey cladding is unable to transmit uni-axial stress to the core due to its strong mechanical anisotropy.

WO-03/100488 describes an optical fibre exhibiting special polarization properties, the fibre comprising a core region and a cladding region; the core region comprising a substantially 1D periodic structure having a substantially elliptical shape, and the cladding region comprising a number of cladding elements (typically air holes) that are placed in a cladding background material, the cladding further comprising two stress-inducing cladding element, the cladding having a background material (typically silica) and an outer, solid overcladding part. Due to the micro-structured core region and its special form, such a fibre is relatively complicated.

OBJECT AND SUMMARY

The problem of the prior art is that either the optical fibre is not able to propagate light in a single mode over a relatively large range of optical wavelengths and/or the birefringence introduced is not large enough and/or not constant over the wavelength range of interest or the fibre is relatively complicated.

The object of the present invention is to provide a photonic crystal fibre showing birefringence over a large range of optical wavelengths. It is a further object to provide a constant birefringence over a large range of optical wavelengths. It is a further object to provide a relatively simple photonic crystal fibre showing birefringence over a large range of optical wavelengths.

The objects of the invention are achieved by the invention described in the accompanying claims and as described in the following.

A Photonic Crystal Fibre

An object of the invention is achieved by a photonic crystal fibre comprising a core region for propagating light in a longitudinal direction of said photonic crystal fibre, a cladding region surrounding said core region, said cladding region comprising micro-structural elements extending in said longitudinal direction, wherein said cladding region further comprises at least one stress element having a coefficient of thermal expansion $\alpha_{T,SAP}$ and extending in said longitudinal direction of said photonic crystal fibre, said at least one stress element being located in a cladding background material having a coefficient of thermal expansion $\alpha_{T,cladback}$ different from $\alpha_{T,SAP}$, and wherein said location of said at least one stress element relative to said core region and said micro-structural elements and said coefficients of thermal expansion $\alpha_{T,SAP}$ and $\alpha_{T,cladback}$ are adapted to provide a stress induced birefringence in said core region of said photonic crystal fibre. Preferably, the coefficient of thermal expansion $\alpha_{T,me}$ of the micro-structural elements is different from that of the at least one stress element. Preferably, at least one of the micro-structural elements is located between the at least one stress element and the centre of the core region when viewed in a transversal cross section of the fibre.

Anisotropic deformation of the core region due to the stress element(s) or a resulting anisotropic strain field (or stress field) induced in the core by the stress element(s) result—due to the elasto-optic effect—in the material(s) comprised in the core region becoming birefringent, whereby different polarization states experience different refractive indices, providing a means for separating the two polarization states of a given longitudinal mode, and optionally eliminating one of them. The combination of a micro-structured fibre (enabling single-mode operation over a large wavelength range) and the induction of an anisotropic strain field in the core region (providing birefringence) enable single mode operation of the waveguide with substantially constant birefringence over a large wavelength range. In an embodiment of the invention, single frequency operation of the waveguide can be obtained.

In the present context, the 'core region' is defined—when viewed in a cross section perpendicular to a longitudinal direction of the fibre—as a (typically central) light-propagating part of the fibre. The core region is limited in a radial direction by micro-structural elements of the cladding region (possibly including any stress element(s) in case a stress element takes the place of a micro-structural element as a nearest neighbour to the core region) or by a cladding region having a background material with a refractive index different from the refractive index of the core region (or different from the refractive index of the background material of the core region, if the region comprises micro-structural elements).

In an embodiment of the invention, the core region and/or the cladding region (including the at least one stress element) have an at most two-fold symmetry (including no symmetry at all) when viewed in a cross section perpendicular to a longitudinal axis of the photonic crystal fibre. In a particular embodiment, the core region and/or the cladding region possess mirror symmetry when viewed in a cross section perpendicular to a longitudinal axis of the photonic crystal fibre.

In a particular embodiment, the core region is non-circular when viewed in a cross section perpendicular to a longitudinal axis of the photonic crystal fibre, such as elongated, e.g. essentially elliptical.

In a particular embodiment, said core region has more than two-fold symmetry or is circular symmetric (such as having an essentially cylindrically symmetric refractive index profile).

The term 'said core region has more than two-fold symmetry or is circular symmetric (such as having an essentially cylindrically symmetric refractive index profile)' is in the present context taken to mean the core region having a doping profile, a chemical composition, a distribution of micro-structural elements or a refractive index profile (the latter being in the absence of stress elements in the cladding region) that, when viewed in a radial direction of a given cross section perpendicular to a longitudinal axis of the photonic crystal fibre, is (more than two-fold or circular) symmetric around a centre of the core region. In an embodiment of the invention, the refractive index profile is rotation symmetric around a centre axis of the core region. The term 'more than two-fold symmetric' is taken to include possible deviations from ideal symmetry due to fabrication tolerances. More than two-fold includes three-fold, four-fold, five-fold, six-fold, or more symmetry. Infinitely-fold symmetric may be understood as circular symmetric.

The term 'micro-structural elements' is in the present context taken to mean structural elements enclosed by a background material, the micro-structural elements having a different refractive index than said background material. A micro-structural element may e.g. be a hole or void or any other element enclosed in a background material and having a refractive index different from that of the background material, e.g. of a fluid or solid material.

The term a 'stress element' (or 'stress applying part' (SAP), the two terms being used interchangeably) is in the present context taken to mean a structural element enclosed by a background material, the stress element being adapted to induce a stress in the core region, e.g. by having a different coefficient of thermal expansion than said background material. The term 'stress element' is understood NOT to include the micro-structural elements. In an embodiment of the invention, the coefficient of thermal expansion $\alpha_{T,SAP}$ of the material constituting the stress element or elements is different from the coefficient of thermal expansion $\alpha_{T,me}$ of the micro-structural elements, such as a relative difference larger than 10%, such as larger than 50%, such as larger than 100%.

In an embodiment of the invention, said core region has a constant refractive index $n_{core}$ or a constant effective refractive index $n_{eff,core}$.

The refractive index $n_x$ is generally the conventional refractive index of a homogeneous material. The effective refractive index $n_{eff,x}$ is the index that light at a given wavelength, $\lambda$, experiences when propagating through a given material that may be inhomogeneous (meaning that the material complex e.g. comprises two or more sub-materials, typically a background material of one refractive index and one or more types of features (typically termed micro-structural elements in the present application) of different refractive index/indices). For homogeneous materials, the refractive and the effective refractive index will naturally be similar.

For photonic crystal fibres according to the present invention, the most important optical wavelengths are in the ultra-violet to infrared regime (e.g. wavelengths from approximately 150 nm to 11 µm). In this wavelength range, the refractive index of most relevant materials for fibre production (e.g. silica) may be considered mainly wavelength independent, or at least not strongly wavelength dependent. However, for non-homogeneous materials, such as fibres comprising micro-structural elements, e.g. voids or air holes, the effective refractive index may be very dependent on the morphology of the material. Furthermore, the effective refractive index of such a fibre may be strongly wavelength dependent. The procedure of determining the effective refractive index at a given wavelength of a given fibre structure having voids or holes is well-known to those skilled in the art (see e.g. Broeng et al, Optical Fibre Technology, Vol. 5, pp. 305-330, 1999).

In an embodiment of the invention, said cladding background material has a refractive index $n_{cladback}$, and wherein the refractive index of the core region $n_{core}$ is essentially equal to $n_{cladback}$ or the effective refractive index of the core region $n_{eff,core}$ is essentially equal to $n_{cladback}$. The term 'essentially equal to' is in the present context taken to mean within 5% of each other, such as within 1%, such as within 0.1% of each other.

In an embodiment of the invention, said core region is homogeneous and made of a single material with refractive index $n_{core}$ (so that the refractive index and the effective refractive index are essentially equal).

In an embodiment of the invention, said stress element is solid. This has the advantage of providing a larger stress or strain and thus a larger birefringence in the core region compared to a hollow stress element. In an embodiment of the invention, said stress element contains a central void or voids or one or more voids filled with a fluid material.

In a particular embodiment, at least one stress element is located in the cladding region adjacent to the core region (e.g. having its centre at a location in the cladding where a micro-structural element would or could otherwise have been located when viewed in a cross section perpendicular to a longitudinal direction of the fibre). This has the advantage of providing a compact fibre design e.g. enabling a polarization maintaining (PM) fibre with the same outer dimensions as a non-PM fibre.

In a particular embodiment, at least one stress element has a refractive index $n_{SAP}$ that is smaller than the refractive index $n_{cladback}$ of said cladding background material. This has the advantage of providing a SAP optically acting like a hole in the structure and thus contributing to the confinement of the light (in addition to its stress control). In an embodiment, the relative index difference $2(n_{cladback}-n_{SAP})/(n_{cladback}+n_{SAP})$ is smaller than 2%, such as smaller than 1%, such as smaller than 0.5%, such as smaller than 0.1%, such as smaller than 0.05%, such as smaller than 0.02%. In an embodiment, the relative index difference is in the range from 0.25% to 0.75%.

The phrase 'a cladding background material having a coefficient of thermal expansion $\alpha_{T,cladback}$ different from $\alpha_{T,SAP}$' is in the present context taken to mean that the difference in the coefficient of thermal expansion of the cladding background material and the stress element is sufficiently large to generate a total strain in the core region to result in a birefringence of at least $0.5*10^{-5}$, such as larger than $5*10^{-5}$, such as larger than $10^{-4}$. The degree of birefringence of an optical waveguide is defined by the difference between the effective mode indices in the two primary polarisation states.

In an embodiment of the invention, the relative difference $2(\alpha_{T,1}-\alpha_{T,2})/(\alpha_{T,1}+\alpha_{T,2})$ in the coefficients of thermal expansion of the stress element and the cladding background material numerically is larger than 1% such as larger than 5% such as larger than 10%. In an embodiment of the invention, the numerical value of the difference $(\alpha_{T,1}-\alpha_{T,2})$ between the coefficients of thermal expansion of the stress element and the cladding background material is larger than $0.1*10^{-6}$ K$^{-1}$, such as larger than $0.5*10^{-6}$ K$^{-1}$, such as larger than $1.0*10^{-6}$ K$^{-1}$.

In an embodiment of the invention, the coefficient of thermal expansion $\alpha_{T,SAP}$ of the material constituting the stress element or elements is larger than the coefficient of thermal expansion $\alpha_{T,cladback}$ of the cladding background material, i.e. $\alpha_{T,SAP}>\alpha_{T,cladback}$, whereby a tensile stress is induced by a stress element in the cladding background material (during manufacturing) in radial directions towards the centre of the stress element. However, in another embodiment of the invention, $\alpha_{T,SAP}<\alpha_{T,cladback}$, whereby a compressive stress is induced by the stress element in the cladding background material. In an embodiment of the invention, the cladding background material is silica, i.e. $\alpha_{T,cladback}=\alpha_{T,silica}$.

By the 'coefficient of thermal expansion' is generally meant the volume coefficient of thermal expansion.

The term 'strain' E refers to the relative change in shape or size (e.g. $\Delta l/l$ in one dimension) of an object due to externally-applied forces. The term 'stress' $\sigma$ refers to the internal force (per unit area) associated with a strain. The term an 'anisotropic resulting strain field in said core region' is in the present context taken to mean a strain field that is different in size in two different directions of a cross section of said core region.

The phrase 'said location of said at least one stress element relative to said core region and said micro-structural elements and said coefficients of thermal expansion $\alpha_{T,SAP}$ and $\alpha_{T,cladback}$ are adapted to provide a stress induced birefringence in said core region' is taken to mean that the number, cross sectional form, dimension(s), mutual distance and distribution of the stress element or elements and the relative magnitude of the coefficients of thermal expansion $\alpha_{T,SAP}$ and $\alpha_{T,cladback}$ (i.e. depending on the materials used) and their possible temperature dependencies are taken into account in the design of a waveguide providing a stress induced birefringence (e.g. by having an 'anisotropic resulting strain field') in said core.

In an embodiment of the invention, the deformation induced by the at least one stress element is essentially elastic (i.e. reversible). In an embodiment of the invention, the elastic behaviour is linear, i.e. there is a linear relationship between stress and strain: $\sigma=EE$, where E is an elastic modulus (the equation reflecting an isotropic material; in an anisotropic material $\sigma$ and E are vectors and E is a tensor).

In an embodiment of the invention, said cladding region comprises
a) a first cladding region surrounding said core region, said first cladding region comprising micro-structural elements extending in said longitudinal direction of said photonic crystal fibre and being located in a first background cladding material;
b) a second cladding region surrounding said first cladding region and comprising a second background cladding material.

Advantages of the 'multi-cladding'-structure (e.g. a double cladding structure) is that various parts or regions of the cladding may be optimized for different purposes, such as the transmission of pump light in a fibre laser, or the accommodation of stress elements, without substantially influencing or degrading the guiding properties of an inner cladding region comprising micro-structural elements. Different cladding regions are e.g. differentiated by different optical properties (such as refractive indices) of their background materials, by different size micro-structural elements (if not interspersed), a cladding region comprising micro-structural elements differing from a cladding region NOT comprising any, etc.

In an embodiment of the invention, the cladding region comprises further cladding regions including a further micro-structured part (e.g. in the form of an air cladding, cf. FIG. 7) surrounding the first and second cladding regions.

In an embodiment of the invention, at least one stress element is located in said first cladding region.

In an embodiment of the invention, at least one stress element is located in said second cladding region. In a preferred embodiment, two stress elements are located in said second cladding region symmetrically around a centre axis of said core region.

In a preferred embodiment, at least one stress element is located partly in said first and partly in said second cladding region.

In a preferred embodiment of the invention, said stress element or elements are located a radial distance from the centre of the core region to allow at least one micro-structural element to be located between a given stress element and the core region, such as at least two micro-structural elements, such as at least three micro-structural elements to be located between a given stress element and the core region when viewed in a cross section perpendicular to a longitudinal axis of the photonic crystal fibre. In other words, in a given transversal cross section of the photonic crystal fibre, at least one 'ring' or 'layer' of micro-structural elements separates the core region and a stress element, such as at least two, such as two or three, such as at least three, such as at least four 'rings' or 'layers' of micro-structural elements.

In an embodiment of the invention, the cladding region comprises at least one, such as at least two stress elements. In an embodiment of the invention, the cladding region has two stress elements. In an embodiment of the invention, said two stress elements are located symmetrically around a centre axis of said core region. These embodiments have the advantage of providing a relatively simple solution and including a photonic crystal fibre with essentially constant birefringence in a large wavelength range.

In an embodiment of the invention, three or more stress elements are included in the cladding region, thereby providing an improved possibility to fine tune a desired stress/strain field in the core region.

In an embodiment of the invention, the photonic crystal fibre comprises at least three stress elements, and at least two of said three or more stress elements have different maximum cross sectional dimensions and/or form. In another embodiment of the invention, said three or more stress elements have identical maximum cross sectional dimensions. In another embodiment of the invention, said three or more stress elements have essentially identical cross sectional form (e.g. circular or polygonal) and dimension.

In an embodiment of the invention said stress element or elements has/have a maximum cross sectional dimension $d_{SAP}$ essentially equal to a minimum distance $\Lambda$ between two neighbouring micro-structural elements, $\Lambda$ being—in the present application—defined as the centre-to-centre distance between two neighbouring micro-structural elements.

In a particular embodiment, at least one stress element has a maximum cross sectional dimension $d_{SAP}$ that is smaller than a minimum distance $\Lambda$ between two neighbouring micro-structural elements, such as smaller than or equal to 0.9 times $\Lambda$, such as smaller than or equal to 0.8 times $\Lambda$, such as smaller than or equal to 0.7 times $\Lambda$. This has the advantage of providing a tool for fine tuning the optical properties of the photonic crystal fibre in combination with the anisotropic stress in the core region.

In an embodiment of the invention, said stress element or elements has/have a maximum cross sectional dimension $d_{SAP}$ that is larger than $\Lambda$, such as larger than $2\Lambda$, such as larger than $5\Lambda$, such as larger than $10\Lambda$.

In an embodiment of the invention, the cladding region comprises at least one stress element having a maximum cross sectional dimension $d_{SAP}$ that is larger than a maximum cross sectional dimension $d_{mse}$ of a micro-structural element of said cladding region. In an embodiment of the invention, $d_{SAP}$ is larger than $2d_{mse}$, such as larger than $5d_{mse}$, such as larger than $10d_{mse}$, such as larger than $20d_{mse}$. Thereby the stress induced into the core region by a particular stress element can be controlled.

In an embodiment of the invention, the cladding region comprises at least one stress element having a maximum cross sectional dimension $d_{SAP}$ that is essentially equal to a maximum cross sectional dimension $d_{mse}$ of a micro-structural element of said cladding region, $d_{mse}$ being e.g. the inner ***dimension of a hole or void or of the liquid or solid material at the centre of a liquid filled or solid micro-structural element.

In an embodiment of the invention, 'essentially equal' in connection with cross sectional fibre dimensions is taken to mean that the fibre is drawn from a preform where the corresponding structural elements (typically canes of circular cross section) have equal outer maximum cross sectional dimension (typically diameter) or inner maximum cross sectional dimension (typically diameter), whichever is appropriate. In an embodiment of the invention, the term 'essentially equal maximum cross sectional dimensions' when comparing $d_{SAP}$ of a solid stress element with $d_{mse}$ of a micro-structural element in the form of a hole or void is taken to mean that the maximum cross sectional dimension (e.g. the cross-sectional outer diameter or the diameter of the stress inducing part) of the structural preform element (e.g. a solid cane) corresponding to the stress element of the photonic crystal fibre is equal to the inner maximum cross sectional dimension (e.g. inner diameter) of the hollow structural preform element corresponding to a micro-structural element (e.g. a capillary tube).

In other words, the inaccuracies or differences—in otherwise equal corresponding dimensions—introduced during the fabrication process is taken to be included by the term 'essentially equal' when relating to such corresponding features in the fabricated fibre. The same goes for the form changes introduced during fabrication, e.g. an originally (i.e. in the preform) circular cross sectional shape may be deformed to a polygonal shape (or other more complex form) as is illustrated by comparison of FIGS. 1 and 2. I.e. e.g. an essentially circular form of a micro-structural element of a photonic crystal fibre is the form that emerges during fabrication originating from an originally circular preform element feature (unless steps have been performed to specifically modify the form).

In an embodiment of the invention, the term 'essentially equal maximum cross sectional dimensions' is taken to mean that the numerical value of $2(\Lambda-d_{SAP})/(\Lambda+d_{SAP})$ is smaller than 30%, such as smaller than 20%, such as smaller than 10%, such as smaller than 5%. $\Lambda$ is the centre-to-centre spacing between two nearest neighbour micro-structural elements in the cladding.

In a preferred embodiment, the refractive index $n_{SAP}$ of said at least one stress element is smaller than the refractive index $n_{cladback}$ of the background material of the inner cladding region, i.e. $n_{SAP} < n_{cladback}$. In a preferred embodiment, the refractive index $n_{SAP}$ of said at least one stress element is smaller than the refractive index $n_{outer}$ of said second cladding region, i.e. $n_{SAP} < n_{outer}$.

In an embodiment of the invention, said core region has a refractive index $n_{core}$, and said first background cladding material has a refractive index $n_{cladback}$; wherein $n_{core}$ is constant and essentially equal to $n_{cladback}$. In an embodiment of the invention, said second background cladding material has a refractive index $n_{outer}$ and $n_{outer}$ is essentially equal to $n_{cladback}$. When the micro-structural elements are voids arranged in a triangular pattern in said cladding region and the ratio $d_{mse}/\Lambda \leq 0.5$, it is achieved that the photonic crystal fibre provides single-mode guidance at any wavelength.

In a preferred embodiment of the invention, the cross-sectional form of the micro-structural elements is essentially circular, essentially circular meaning drawn from a preform where the corresponding structural elements have a circular cross section. However, the cross sectional form of the micro-structural elements may take on any appropriate form such as essentially triangular, quadratic, polygonal, elliptical, etc., as implemented by drawing a fibre from a preform having corresponding structural elements of corresponding form(s), possibly modifying the form by proper control of the pressure of capillary preform elements during fabrication. In an embodiment of the invention, the micro-structural elements are holes or voids. The fabrication of photonic crystal fibres by drawing from a preform is e.g. discussed by Bjarklev, Broeng and Bjarklev in "Photonic Crystal Fibres", Kluwer Academic Press, 2003 (referred to in the following as [Bjarklev et al.]), chapter 4, pp. 115-130, which is incorporated herein by reference.

In an embodiment of the invention said micro-structural elements possesses an essentially n-fold rotational symmetry around a centre axis of said core region, meaning that a cross sectional pattern of the micro-structural elements matches n times (n being an integer larger than zero) during a full rotation of 360° of the pattern around said axis. In an embodiment of the invention, n equals one (meaning that the pattern of micro-structural elements does not possess a rotational symmetry around the centre axis of the core region). In an embodiment of the invention, n equals two. In an embodiment of the invention, n is larger than two, such as equal to 3, such as equal to 4, such as equal to 5, such as equal to 6, such as larger than 6.

In an embodiment of the invention, the cross sectional pattern of the micro-structural elements (and/or stress elements) is defined by the location of the centres of said micro-structural elements (and/or stress elements) in the cross section in question.

In an embodiment of the invention, the micro-structural elements are arranged in the cladding region in an essentially two dimensional periodic or non-periodic pattern when viewed in a transversal cross section of the photonic crystal fibre. In an embodiment of the invention, the micro-structural elements are arranged in the cladding region in a rectangular pattern. In an embodiment of the invention, the micro-structural elements are arranged in the cladding region in a triangular pattern. In an embodiment of the invention, the micro-structural elements are arranged in the cladding region in a quadratic pattern. In an embodiment of the invention, the micro-structural elements are arranged in the cladding region in a hexagonal pattern. The various patterns may be achieved by proper dimensioning of constituent preform elements and their stacking to a preform reflecting the pattern in question and subsequent drawing to a fibre as e.g. described in [Bjarklev et al.], chapter 4.

In an embodiment of the invention, said micro-structural elements have essentially identical form and/or maximum dimension $d_{mse}$ in a cross section perpendicular to a longitudinal axis of the fibre (interchangeably termed a transversal cross section in the present application).

In preferred embodiments of the invention, the ratio $d_{mse}/\Lambda$ of the maximum dimension $d_{mse}$ of the micro-structural elements to a minimum distance $\Lambda$ between two neighbouring micro-structural elements is smaller than or equal to 0.8, such as smaller than or equal to 0.5, such as smaller than or equal to 0.35, such as smaller than or equal to 0.25, such as smaller than or equal to 0.15.

In preferred embodiments of the invention, the ratio $d_{mse}/\Lambda$ of the maximum dimension $d_{mse}$ of the micro-structural elements to a minimum distance $\Lambda$ between two neighbouring micro-structural elements is in the range from 0.02 to 0.80, such as from 0.02 to 0.10 (corresponding to large cores created by stacking several preform core elements (e.g. solid rods)), such as from 0.10 to 0.25 (corresponding to medium cores created by stacking from 3 to 7 preform core elements (e.g. solid rods)), such as from 0.25 to 0.45 (corresponding to cores created by stacking from 1 to 3 preform core elements (e.g. solid rods), such as from 0.45 to 0.80 (corresponding to cores created by 1 preform core element (e.g. a solid rod).

Especially, for non-linear fibres (where the pitch, $\Lambda$, is typically smaller than or equal to 3 times the application wavelength and the core consists of one rod), it is be interesting to work with $d_{mse}/\Lambda$ larger than 0.5. This kind of fibre is not endlessly single-mode but has a well-defined cut-off of the higher-order mode (cf. e.g. Folkenberg, Optics Letters, vol. 28, no. 20, p. 1882 (2003)). Typically, the value of $d_{mse}/\Lambda$ is in the range from 0.5 to 0.8 to provide the desired cut-off wavelength.

The mentioned preferred ranges of the ratio $d_{mse}/\Lambda$ refer to a silica based photonic crystal fibre, assuming that the outer dimension of the core and cladding preform elements are essentially equal. Other glass systems may, however, be used, which require a modification, such as is known in the art, of the preferred ranges of $d_{mse}/\Lambda$ to provide single mode operation of the waveguide in a large wavelength range. For fluoride glass based waveguides, for example, smaller holes are generally used leading to lower $d_{mse}/\Lambda$ values. The preferred ranges of $d_{mse}/\Lambda$ are aimed at providing either an endlessly single mode photonic crystal fibre or a photonic crystal fibre that is single mode at the application wavelength (cf. e.g. Mortensen, Optics Letters, vol. 28, no. 6, p. 393 (2003) for a fibre with a '3 rod-core' and e.g. Mortensen, Optics Letters, vol. 28, no. 20, p. 1879 (2003) for a fibre with a '1 rod-core').

In another embodiment, said micro-structural elements include elements of at least two different maximum dimensions $d_{mse,1}$, $d_{mse,2}$ and/or forms (e.g. the cladding region comprising voids of two different inner diameters and/or forms) in a transversal cross section. Holes or voids in the photonic crystal fibre of different size may be obtained by drawing the fibre from a preform comprising preform cladding elements having different inner dimensions $d_{preform-in,1}$ and $d_{preform-in,2}$ (but, optionally, same outer diameter $d_{preform-out,1}=d_{preform-out,2}$).

In an embodiment of the invention, a number N of stress elements are located in the cladding region, each stress element having a maximum external dimension of $d_{SAP,i}$, i=1, 2, ..., N. In an embodiment of the invention, at least one stress element (e.g. element p) has a maximum external dimension $d_{SAP,p}$ different from another stress element (e.g. element q) having a maximum external dimension $d_{SAP,q}$, i.e. $d_{SAP,p} \neq d_{SAP,q}$. Thereby an increased flexibility in designing the anisotropic strain field is provided, since in addition to the number, location, the form, etc., also different cross sectional dimensions of the stress elements may be utilized to shape the strain field.

In an embodiment of the invention, a number N of stress elements are located in the cladding region, each stress element having a coefficient of thermal expansion $\alpha_{T,SAP,i}$, i=1, 2, ..., N. In an embodiment of the invention, at least one stress element (e.g. element r) has a coefficient of thermal expansion $\alpha_{T,SAP,r}$ different from another stress element (e.g. element s) having a coefficient of thermal expansion $\alpha_{T,SAP,s}$, i.e. $\alpha_{T,SAP,r} \neq \alpha_{T,SAP,s}$. Thereby an increased flexibility in designing the anisotropic strain field is provided, since in addition to the number, location, the form, the size, etc., of the stress elements also mutually different coefficients of thermal expansion may be utilized to shape the strain field. In an embodiment of the invention, the numerical value of the relative difference $2(\alpha_{T,SAP,r}-\alpha_{T,SAP,s})/(\alpha_{T,SAP,s}+\alpha_{T,SAP,s})$ in the coefficients of thermal expansion of the stress elements r an s is larger than 10% such as larger than 50% such as larger than 100%. In an embodiment of the invention, the coefficients of thermal expansion $\alpha_{T,SAP,r}$ and $\alpha_{T,SAP,s}$ of the materials constituting the stress element r and s are, respectively larger than and smaller than the coefficient of thermal expansion $\alpha_{T,cladback}$ of the cladding background material, i.e. fulfil the relation $\alpha_{T,SAP,r} > \alpha_{T,cladback} > \alpha_{T,SAP,s}$. Thereby an increased flexibility in the design of the stress-/strain-field of the core region is provided. In an embodiment of the invention, the cladding background material is silica, i.e. $\alpha_{T,cladback}=\alpha_{T,silica}$. Typically the refractive indices of materials having different coefficient of thermal expansion are also different. In an embodiment of the invention, the refractive index $n_{SAP,r}$ and $n_{SAP,s}$ of the materials constituting the stress element r and s are, respectively larger than and smaller than the refractive index $n_{cladback}$ of the cladding background material, i.e. fulfil the relation $n_{SAP,r} > n_{cladback} > n_{SAP,s}$. Thereby an increased flexibility in controlling the guiding properties of the cladding region comprising stress elements is provided. Examples of physical properties of relevant materials including such having different refractive indices and coefficients of thermal expansion are e.g. given in "Handbook of Optics", Vol. II, ed. by Bass et al., McGraw-Hill, second edition, 1995, chapter 33 on "Properties of crystals and glasses", which is incorporated herein by reference. Fused silica e.g. has a coefficient of thermal expansion $\alpha_{T,silica}$ of $0.51*10^{-6}$ K$^{-1}$ (ibid table 19, pp. 33.54-55).

In a preferred embodiment of the invention, the cross sectional form of the stress element(s) is essentially circular, essentially circular meaning drawn from a preform where the corresponding structural elements have a circular cross section. However, the cross sectional form of the stress element(s) may take on any appropriate form such as triangular, quadratic, polygonal, e.g. hexagonal, elliptical, etc., as implemented by drawing a fibre from a preform having corresponding structural elements of corresponding form(s). In an embodiment of the invention comprising more than one stress element, the cross sectional form of at least one stress element is different from the cross sectional form of another stress element.

In an embodiment of the invention, the at least one stress element has an essentially semi-circular or D-shaped form or has the form essentially of an angular segment of a ring when viewed in a cross section perpendicular to a longitudinal axis of said photonic crystal fibre. Thereby the stress/strain field induced in the core region can be further optimized to provide a given birefringence.

In an embodiment of the invention, said at least one stress element comprises a material having a refractive index $n_{SAP}$ that is different from the refractive index $n_{cladback}$ of said surrounding cladding background material. In an embodiment of the invention, the refractive index $n_{SAP}$ of a stress element is smaller than the refractive index $n_{cladback}$ of the cladding background material wherein the stress element is enclosed. This has the advantage that light in the cladding region will be confined mainly outside the stress element(s), whereby the influence of the stress elements on the transmission properties of the waveguide is reduced.

In an embodiment of the invention, $n_{SAP}$ is adapted to be essentially equal to $n_{cladback}$, whereby the stress elements—with respect to light propagation—effectively act as a part of the background cladding material.

In an embodiment of the invention, said at least one stress elements are positioned relative to each other to show an n-fold rotational symmetry relative to a centre axis of said core region. An n-fold rotational symmetry of the stress element(s) around an axis is in the present context taken to mean that a cross sectional pattern of the stress elements will essentially match n times during a full rotation of 360° of the pattern around said axis. In an embodiment of the invention, said one or more stress elements are positioned relative to each other to show no rotational symmetry relative to a centre axis of said core region. No rotational symmetry around a centre axis meaning that a cross sectional pattern of the stress elements will only match after a full rotation of 360°. In another embodiment of the invention, said one or more stress elements are positioned relative to each other to show a twofold rotational symmetry relative to a centre axis of said core region. In yet another embodiment of the invention, the one or more stress elements are positioned relative to each other to show an n-fold rotational symmetry relative to a centre axis of said core region, where n is odd and larger than 1. This has the advantage of facilitating the provision of an anisotropic stress/strain field in the core region.

In an embodiment of the invention, the core region is essentially circular in a transversal cross section of the fibre, essentially circular meaning drawn from a preform where the corresponding structural element has a circular cross section, e.g. a circular core cane (hollow or solid) surrounded by a number (e.g. 6) of (e.g. circular) canes constituting a part of the cladding region. In an embodiment of the invention, the core region has an n-fold symmetry (as e.g. implemented by drawing a fibre from a preform comprising one or more (stacked) canes representing the core region), such as an at most two-fold rotational symmetry around a centre axis of the core region. In an embodiment of the invention, n is larger than two, such as equal to 3, such as equal to 4, such as equal to 5, such as equal to 6, such as larger than 6. In an embodiment of the invention, the core region comprises micro-structural features. In an embodiment of the invention, said micro-structural features of the core region determine the degree of symmetry of the core region.

In a particular embodiment, the photonic crystal fibre (including the core and cladding regions and the stress element(s)) possesses an essentially n-fold rotational symmetry around a centre axis of said core region, where n is larger than or equal to two. This is taken to mean that a cross sectional pattern of the micro-structural elements (of the cladding and—if relevant—the core regions) and the stress element(s) matches n times during a full rotation of 360° of the pattern around said axis. In an embodiment of the invention, n equals two. In an embodiment of the invention, n is larger than two, such as equal to 3, such as equal to 4, such as equal to 5, such as equal to 6, such as larger than 6.

In general, the rotational symmetry of the micro-structural elements is independent of the rotational symmetry of the stress elements. However, in an embodiment of the invention, said micro-structural elements and said stress elements possess a common n-fold rotational symmetry. In an embodiment of the invention, n is larger than one, such as equal to two, such as larger than 2, such as equal to 3, such as equal to 5, such as larger than 5. In an embodiment of the invention, said photonic crystal fibre (including the core region) possesses a common n-fold rotational symmetry. In an embodiment of the invention, n is larger than one, such as equal to two, such as larger than 2, such as equal to 3, such as equal to 5, such as larger than 5. This has the advantage of facilitating the provision of an anisotropic stress/strain field in the core region.

In an embodiment of the invention, said photonic crystal waveguide is adapted to propagate light of a wavelength $\lambda$ comprised in the range from 0.15 µm to 11 µm, such as from 0.15 µm to 2.5 µm, such as from 0.4 µm to 1.7 µm.

In an embodiment of the invention, a maximum dimension of the core region $d_{core}$ is larger than said wavelength $\lambda$ propagated by said photonic crystal fibre, such as larger than 5 times $\lambda$, such as larger than 10 times $\lambda$, such as larger than 20 times $\lambda$, such as larger than 30 times $\lambda$, whereby large mode area—or large core—photonic crystal fibres with relatively strong birefringence can be made.

In an embodiment of the invention, the modal birefringence of the core region $B_{mode}$ is larger than $5*10^{-5}$, whereby the fibre exhibits a controlled birefringence that is larger than any unintentional birefringence (from e.g. bending, external pressure, etc.). In particular embodiments, $B_{mode}$ is larger than $3*10^{-5}$, such as larger than $5*10^{-5}$, such as larger than $7.5*10^{-5}$, such as larger than $1*10^{-4}$.

In an embodiment of the invention, a maximum dimension of the core region $d_{core}$ is in the range from 1-300 µm, such as from 1-200 µm, such as from 1 µm to 100 µm.

In an embodiment of the invention, said maximum dimension $d_{mse}$ of one of said micro-structural elements, said minimum distance $\Lambda$ between two neighbouring micro-structural elements, and said coefficients of thermal expansion $\alpha_{T,cladback}$ and $\alpha_{T,SAP}$ of said cladding background material and said stress elements, respectively, are adapted to provide no cut-off, whereby the fibre exhibits single-mode operation over a broad (endless) wavelength range and at the same time a relatively uniform birefringence.

In a particular embodiment, the photonic crystal fibre comprises two groups of stress elements arranged mirror-symmetrically around a line through the centre of the core region when viewed in a transversal cross section of the photonic crystal fibre.

In a particular embodiment, each group of stress elements comprises at least one stress element, such as at least two, such as at least three, such as at least four, such as at least five, such as at least six, such as at least eight stress elements. By adapting the number, size and position of the stress elements (together with their physical properties, such as the coefficient of thermal expansion), the resulting stress field in the core region may be flexibly adapted.

In a particular embodiment, the stress elements are arranged adjacent to and as close as possible to the core region, thereby providing maximum impact on the stress field in the core region.

In a particular embodiment, the groups of stress elements are arranged relative to each other so that two straight lines through the centre of said core region dividing a transversal cross section of the photonic crystal fibre in four fields and each line touching the outline of at least one stress element of each group thereby enclose said two groups of stress elements in opposite fields and define an enclosing centre angle y wherein y is smaller than or equal to 130°, such as smaller than or equal to 110°, such as smaller than or equal to 90°, such as smaller than or equal to 75°. This has the advantage of minimizing the mutual cancellation of contributions of the stress elements to the stress field in the core region. In an embodiment, the enclosing angle y is in the range from 45° to 130°, such as in the range from 75° to 110°, optionally adapted to an appropriate value with a view to the actual cross sectional geometry of the photonic crystal fibre (e.g. influenced or determined by the cross sectional geometry of the preform from which the fibre is drawn).

In a particular embodiment, the cladding region comprises an outer air cladding region surrounding the core region, the stress elements and at least a part of the cladding region. By combining the features of the core region, stress elements and inner cladding region shown and/or discussed in the present section, in the detailed description, in the drawings and in the claims with an outer cladding region comprising at least one ring of relatively large holes forming a so-called air cladding (cf. e.g. WO-03/019257 regarding various embodiments and a method of manufacturing of air-clad fibres), a large number of potentially interesting photonic crystal fibres can be provided.

In a particular embodiment, a photonic crystal fibre is provided which is adapted to guide a fundamental mode of light at a predetermined wavelength wherein the difference $\Delta n$ between the effective refractive index $n_{mode}$ of said fundamental mode and the effective refractive index $n_{eff}$ of the cladding region is adapted to be less than or substantially equal to the modal birefringence $B_{mode}$ of the core region thereby providing a single polarizing bandwidth $\Delta\lambda$ wherein only one of the fundamental polarization states is guided. This has the advantage of providing a polarizing fibre which may be used in applications benefiting from the separation or selection of one of the two polarization states e.g. in single frequency fibre lasers. The term 'substantially equal' is in the present context taken to mean within 100% of each other, such as within 50%, such as within 20%, such as within 10%, such as within 5% of each other (e.g. calculated as the ratio ABS[$B_{mode}-\Delta n$]/$B_{mode}$, ABS[x] indicating the numerical value of x).

In a particular embodiment, $\Delta n$ is adapted to be smaller than 50% of $B_{mode}$, such as smaller than 20% of $B_{mode}$, such as smaller than 10% of $B_{mode}$.

In a particular embodiment, the size of the single polarizing bandwidth $\Delta\lambda$ and/or its centre wavelength $\lambda_c$ is controlled by controlling a parameter selected from the group of parameters comprising the difference $\Delta\alpha_T$ between the coefficients of thermal expansion $\alpha_{T,SAP}$ and $\alpha_{T,cladback}$ of said at least one stress element and said cladding background material, respectively, the minimum distance $\Lambda$ between two neighbouring micro-structural elements, the relative size of the micro-structural elements $d/\Lambda$, the difference between the core $n_{core}$ and cladding background $n_{cladback}$ indices, the bending radius of the photonic crystal fibre, and combinations thereof. This has the advantage of enabling a tailoring of the polarizing bandwidth and its centre wavelength to the particular application in question. The control of the core and cladding background refractive indices further allows the control of the mode field diameter thereby facilitating splicing to other micro-structured or non-micro-structured optical fibres. In an embodiment, $n_{core} \leq n_{cladback}$, such as $n_{core} < n_{cladback}$ or $n_{core} = n_{cladback}$.

In an embodiment of the invention, said cladding background material and/or said core region and/or said at least one stress element comprises silica, thereby taking advantage of industry standard, proven technology for manufacturing optical waveguides. Other materials may be used though, e.g. fluoride (e.g. fluorozirconate), tellurite, phosphate or chalcogenide based glasses or polymer materials, whereby the fibre may be optimised for particularly strong birefringence and/or specific wavelengths/wavelength ranges.

In an embodiment of the invention, said at least one stress element comprises borosilicate, whereby stress elements from well-established technologies may be employed, (see e.g. J. Noda et al., Journal of Lightwave Technology, vol. LT-4, no. 8, p. 1071, (1986)).

In an embodiment of the invention, said core region comprises refractive index modifying, photosensitive and/or optically active dopant material(s), whereby gratings may be written in the fibre and/or the fibre may be used for optical amplification/lasing.

In an embodiment of the invention, said core region comprises a rare earth dopant ion, such as Er, Yb, Nd, Ho, Sm or Tm or combinations thereof.

In an embodiment, the at least one stress element when viewed in a cross section perpendicular to the longitudinal direction of the fibre has an inner side substantially facing the core region and an outer side substantially facing away from the core region and wherein the micro-structural elements are arranged in such a way that no micro-structural elements are located along the outer side of the stress element. This has the advantage of reducing the risk of stress-induced fractures of micro-structural elements during production of the fibre.

It is to be understood that the term 'arranged in such a way that no micro-structural elements are located along the outer side of the stress element' is intended to cover arrangements where no micro-structural elements are located along a part of the outer side of the stress element, such as at least over 50% of the outer side, such as over the majority of the outer side. In an embodiment, the inner and outer sides together make up the whole periphery of the stress element in the cross section considered, e.g. each constituting half of the total peripheral circumference.

In an embodiment, the at least one stress element—when viewed in a cross section perpendicular to the longitudinal direction of the fibre—appears as one single element, such as one homogeneous element. This may e.g. be accomplished by making a preform wherein the preform stress element IS constituted by one element, which—when drawn to a fibre—appears as one element in the fibre. Alternatively, the same result may be accomplished if the stress element—although appearing in the drawn fibre as one single element—is made up of a number of individual preform stress elements of the same material (and possibly of the same cross sectional dimension) stacked together and then drawn to a fibre.

Alternatively, a stress element when viewed in a cross section perpendicular to the longitudinal direction of the fibre is composed of a number of smaller elements in a group. This may e.g. be accomplished by stacking a number of preform stress elements in a group where each preform stress element has a shell of material (e.g. an outer shell, e.g. of a material equal to the background material of a cladding region of the optical fibre, e.g. silica) that is different from the material of other parts of the preform stress element. When the preform comprising the stacked preform elements is heated and drawn to a fibre, a stress element in the fibre will have a scaled down structure corresponding to that of the mentioned group of preform stress elements and thus effectively appear to be composed of a number of individual stress elements in a group.

In an embodiment, the stress element has an area in a cross section of the fibre corresponding to 3 or more, such as 6 or more, such as 12 or more adjacent micro-structural elements.

In a particular embodiment, the group of stress elements comprise 3 or more, such as 6 or more, such as 12 or more smaller elements.

In a particular embodiment, micro-structural elements extend around the at least one stress element, such that the stress element is surrounded by micro-structural elements.

A Preform

A preform for fabricating a photonic crystal fibre according to an aspect of the invention and as described in section 'A photonic crystal fibre above', the preform comprising stacked longitudinal preform elements is furthermore provided by the present invention. The preform elements comprise at least one preform core element, a number of preform cladding elements, at least one preform stress element, and optionally a preform overcladding tube, and wherein said preform core element, said preform cladding elements and said at least one preform stress element are stacked and optionally placed in said preform overcladding tube. It is thereby ensured that a photonic crystal fibre with fairly constant birefringence over a relatively large range of optical wavelengths can be fabricated.

In an embodiment of the invention, the preform core element is a rod comprising a material having a refractive index $n_{core}$. In another embodiment of the invention, the preform cladding elements comprise capillary tubes comprising a material having a refractive index $n_{cladback}$. In still another embodiment of the invention, the at least one preform stress element is a rod comprising a material having a refractive index $n_{SAP}$. In yet another embodiment of the invention, an outer dimension $D_{SAP}$ of said preform stress element is larger than an outer dimension $D_{clad}$ of said preform cladding elements, thereby providing a basis for the manufacturing of a preferred embodiment of a photonic crystal fibre according to the invention. In another embodiment of the invention, the at least one of said preform elements comprises silica. In an embodiment of the invention, two circular, semi-circular (i.e. D-shaped) or segmented-ring-shaped preform stress elements are symmetrically located around said preform core element or elements, thereby providing a large design flexibility for providing a desired stress induced birefringence in the core region of a resulting photonic crystal fibre manufactured from the preform.

In a particular embodiment, an outer dimension $D_{SAP}$ of said preform stress element is substantially equal to an outer dimension $D_{clad}$ of said preform cladding elements. This has the advantage that preform stress elements may be substituted for preform cladding elements without otherwise redesigning the preform. Further by having a multitude of stress elements, a large design freedom in the resulting stress field (e.g. size and direction) of the core region (and thus the birefringence of the fibre) is provided. The term 'substantially equal' is in the present context taken to mean within 20% of each other, such as within 10%, such as within 5%, such as within 2%, such as within 1% of each other (e.g. calculated as the numerical value of the ratio $(D_{SAP}-D_{clad})/D_{SAP}$). In an embodiment, the preform stress element comprises a doped (e.g. B-doped) central part having a largest cross sectional dimension $D_{SAP'}$ that is smaller than the outer dimension $D_{SAP}$. In an embodiment, the part of the preform stress element outside the central doped part is made of the same material as a cladding preform element (e.g. silica). Consequently, in a fibre drawn from a preform where $D_{clad} \sim D_{SAP} (>D_{SAP'})$, the largest cross sectional dimension $d_{SAP}$ is smaller than the minimum centre-to-centre distance $\Lambda$ of micro-structural features of the cladding region.

In a particular embodiment, said preform cladding elements comprise a number of large hole capillary tubes arranged to form at least one outer ring surrounding said at least one preform core element, said at least one preform stress element and at least a part of said preform cladding elements, said arrangement of large hole capillary tubes being suitable for forming an outer air cladding in a photonic crystal fibre drawn from said preform.

Other embodiments of a preform according to the invention appear from the detailed description and the drawings.

As e.g. discussed in [Bjarklev et al.], chapter 4, pp. 115-130, a method of manufacturing a photonic crystal fibre is provided by drawing a fibre from a preform as described above and as defined by the accompanying drawings, the detailed description and claims, wherein the preform has corresponding structural elements of corresponding relative size(s) and form(s) as the photonic crystal fibre drawn from it. The transversal cross section of the photonic crystal fibre may be adapted by proper control of the pressure of capillary preform elements (and/or interstitial holes between preform elements) during manufacturing.

An Article Comprising a Photonic Crystal Fibre

An article comprising a photonic crystal fibre according to an aspect of the invention and as described in section 'A photonic crystal fibre above' is moreover provided by the present invention, whereby improved devices performing specific functions such as lasers or amplifiers can be provided.

In an embodiment of the invention, the article is a fibre amplifier.

In an embodiment of the invention, article is a fibre laser.

Use of a Photonic Crystal Fibre

Use of a photonic crystal fibre according to an aspect of the invention and as described in section 'A photonic crystal fibre above' is moreover provided by the present invention, whereby specific functional features can be achieved in a relatively simple and economic way.

In embodiments of the invention, use is made of a photonic crystal fibre as a polarization maintaining fibre, in a polarization maintaining fibre amplifier, in a polarization maintaining fibre laser, as a polarizing fibre, in a polarizing fibre amplifier or in a polarizing fibre laser.

Further objects of the invention are achieved by the embodiments defined in the dependent claims and in the detailed description of the invention.

It should be emphasized that the term "comprises/comprising" when used in this specification is taken to specify the presence of stated features, integers, steps or components but does not preclude the presence or addition of one or more other stated features, integers, steps, components or groups thereof.

BRIEF DESCRIPTION OF DRAWINGS

The invention will be explained more fully below in connection with a preferred embodiment and with reference to the drawings in which:

FIG. 3 shows the measured attenuation spectrum of the fibre shown in FIG. 2 for the wavelength range between 400 and 1700 nm;

FIG. 11 shows a schematic cross section of a photonic crystal fibre according to the invention, where a solid core is surrounded by six hexagonally located holes or voids and two stress elements are located separate there from;

FIG. 29 shows a cross sectional view of a central part of an optical fibre according to the invention wherein two groups of individual stress elements are located symmetrically around the core region. The photographs are obtained from an optical microscope that illuminates a short length of around 4 cm of the fibre with white light.

The figures are schematic and simplified for clarity, and they just show details which are essential to the understanding of the invention, while other details are left out.

MODE(S) FOR CARRYING OUT THE INVENTION

Optical fibres according to the present invention (termed photonic crystal fibres) have a longitudinal direction and a cross section perpendicular thereto. The cross section of a photonic crystal fibre may vary along its length, but is typically constant. Most references to physical fibre parameters—such as dimensions—and figures of fibre designs refer to or illustrate a photonic crystal fibre cross section.

Figure 1:
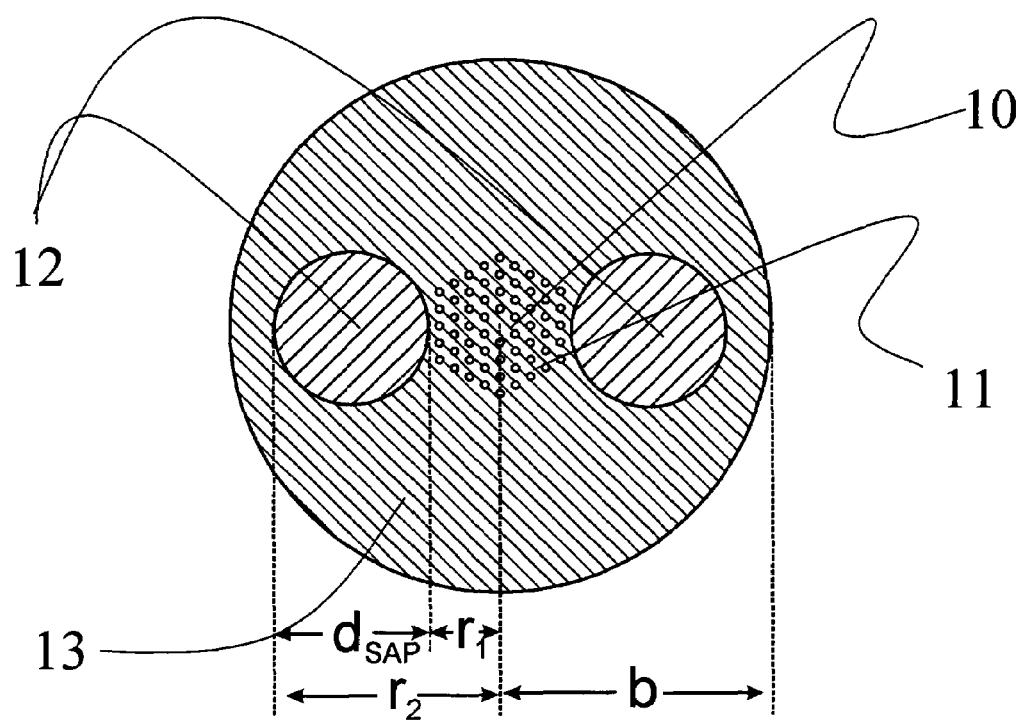
FIG. 1 shows a schematic drawing of a cross section of a photonic crystal fibre according to the invention.

One preferred embodiment of an optical fibre according to the present invention is shown schematically in FIG. 1. In a cross section, the fibre in FIG. 1 comprises a core region 10, an inner cladding region 11, an outer cladding which comprises two stress applying parts (SAPs) 12 and a background material 13. The core region 10 comprises silica material with a refractive index $n_{core}$. The index in the core region may vary across the core or may be constant. The inner cladding region 11 is composed of micro-structural elements, here voids or air holes, in a background silica material of refractive index $n_{cladback}$. The voids or air holes have a diameter, d, and are arranged in a triangular lattice with a period of Λ, the period Λ being defined as the smallest centre to centre distance between two voids. The outer cladding region 13 is composed of a silica material with refractive index $n_{outer}$. The SAPs 12 in the outer cladding region 13 are composed of a silica material with a refractive index $n_{SAP}$, such that $n_{SAP} < n_{cladback}$ and $n_{SAP} < n_{outer}$. As appears from FIG. 1—representing a preferred embodiment—the diameters of the SAPs are equal and denoted $d_{SAP}$, the diameter of the outer boundary of the outer cladding region 13 is $d_{fibre} = 2b$ and the distance from the innermost and outermost edges of the SAPs to the centre of the core region 10 of the fibre are $r_1$ and $r_2$, respectively (innermost and outermost being defined relative to the centre of the core region 10). The thermal expansion coefficient of the silica material in core region 10, inner cladding region 11 and outer cladding region 13 is $\alpha_{T,Si}$ and the thermal expansion coefficient of the stress elements (SAPs) is $\alpha_{T,SAP}$.

The triangular cladding structure of holes in the cladding region 11, is known to facilitate single-mode guidance of the fibre at any wavelength for $d/\Lambda \leq 0.5$, if $n_{core}$ is constant and $n_{core} = n_{cladback} = n_{outer}$. At short wavelengths, guidance is limited by micro- and macro bending losses, and at long wavelengths guidance is limited by leakage losses.

The orientation of the SAPs with respect to the microstructured cladding region may be chosen in different ways. In FIG. 1, one preferred embodiment is shown. The configuration of cladding and stress elements in FIG. 1 has a 2-fold rotational symmetry around a central axis of the core region 10 perpendicular to the cross section (i.e. parallel to a longitudinal direction of the photonic crystal fibre). The cladding region may be rotated by 30 degrees (or n times 30°, where n is an integer) relative to the stress elements and provide another possible configuration. Other preferred configurations may be provided by rotating the cladding region by any angle between 0 and 30 degrees relative to the stress elements.

In the drawing process of the fibre, the SAP region 12 and the other regions 10, 11 and 13 will contract by a different amount when the fibre is cooled below the softening temperature of the silica material. Thus a stress distribution will be present in the fibre, and due to the elasto-optic effect the silica material will become birefringent. The stress field in the core region 10 determines the modal birefringence of the guided modes. Since the elasto-optic effect is substantially constant as a function of wavelength, the preferred embodiment of the invention shown in FIG. 1 enables single-mode guidance with constant birefringence in a very broad spectral range.

ΔT is the temperature difference between room temperature and the softening temperature of the core, E is Young's modulus of silica, v is Poisson's ratio of silica and C is the photo elastic constant of silica. The characteristic birefringence, $B_m$, of the combination of silica and the SAPs is given by (Noda et al., J. Light. Techn., LT-4, 8, 1986):

$$B_m = \frac{|\alpha_{T,Si} - \alpha_{T,SAP}| \cdot \Delta T \cdot E \cdot C}{2(1-v)}$$

In the absence of voids or air holes, corresponding to a hole diameter d=0, the birefringence, B, at the centre of the core region is given by:

$$B = 4B_m \left(\frac{r_2 - r_1}{r_2 + r_1}\right)^2 \left\{1 - 3\left(\frac{r_1 r_2}{2b}\right)^4\right\}$$

This relation applies to the modal birefringence of conventional polarization maintaining fibres of the PANDA type (cf. e.g. P. L. Chu, J. Light. Techn., LT-2, 5, 1984). For designs with d>0, the realized birefringence is expected to be different from B obtained from the relation above. Since the stress field does not penetrate into the air holes, and since the stress will be carried by a smaller volume of glass than in a solid fibre (d=0), the stress may locally be either higher or lower compared to a solid glass fibre with an identical geometry of the SAP regions. The prefactor $4B_m$ in the relation above has been calibrated experimentally to a value of $5.4 \cdot 10^{-4}$ for SAP material with 14-17 mole % $B_2O_3$ based on the geometry of a measured sample fibre from the supplier. For calculated values of the birefringence this value of $4B_m$ will be used in the following.

Figure 2:
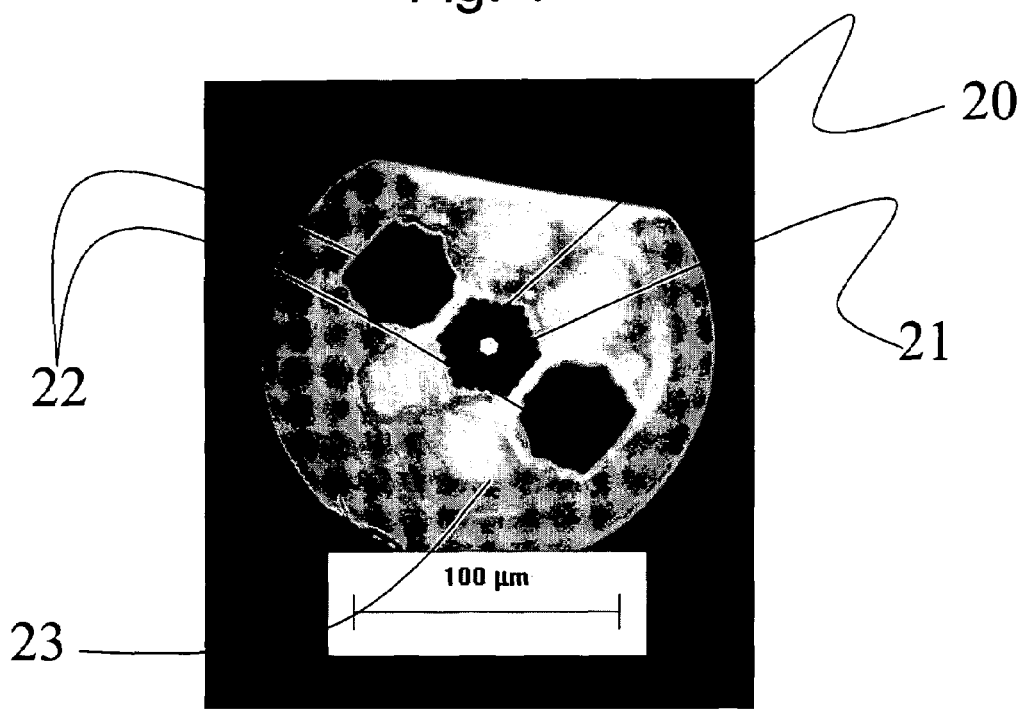
FIG. 2 shows a scaled photomicrograph of one possible realization of a photonic crystal fibre according to the invention.

FIG. 2 shows a photomicrograph of the cross section of an optical fibre realized according to a preferred embodiment of the present invention. The dimensions of the structure are $d_{fibre}$=173 μm, $\Lambda$=4.4 μm, $d/\Lambda$=0.48. The core region 20, the cladding region 21 and the outer region 23 are made of pure silica, such that $n_{core}$=$n_{clad}$=$n_{outer}$. The SAP regions 22 are made of B-doped and Ge-doped silica, with dopant concentrations of 14-17 mole % $B_2O_3$ and 3-4 mole % $Ge_2O_3$. Due to the production process, the border of the SAP region is not circular. The SAP regions may be approximated by circles having the same area and centre of mass as the SAP regions in FIG. 2. The equivalent circles corresponding to the SAP region in FIG. 2 are given by $d_{SAP}$=40 μm, $r_1$=22 μm and $r_2$=62 μm, $r_1$ and $r_2$ having the meaning defined in connection with FIG. 1.

In FIG. 3 the attenuation spectrum of the fibre in FIG. 2 is shown. The three peaks marked 30, are due to higher order absorptions of the Si—OH bond at 945 nm, 1240 nm and 1390 nm. The absence of peaks originating from the cut-off of higher-order modes indicates that the fibre is single-moded in the measured spectral range.

Figure 4:
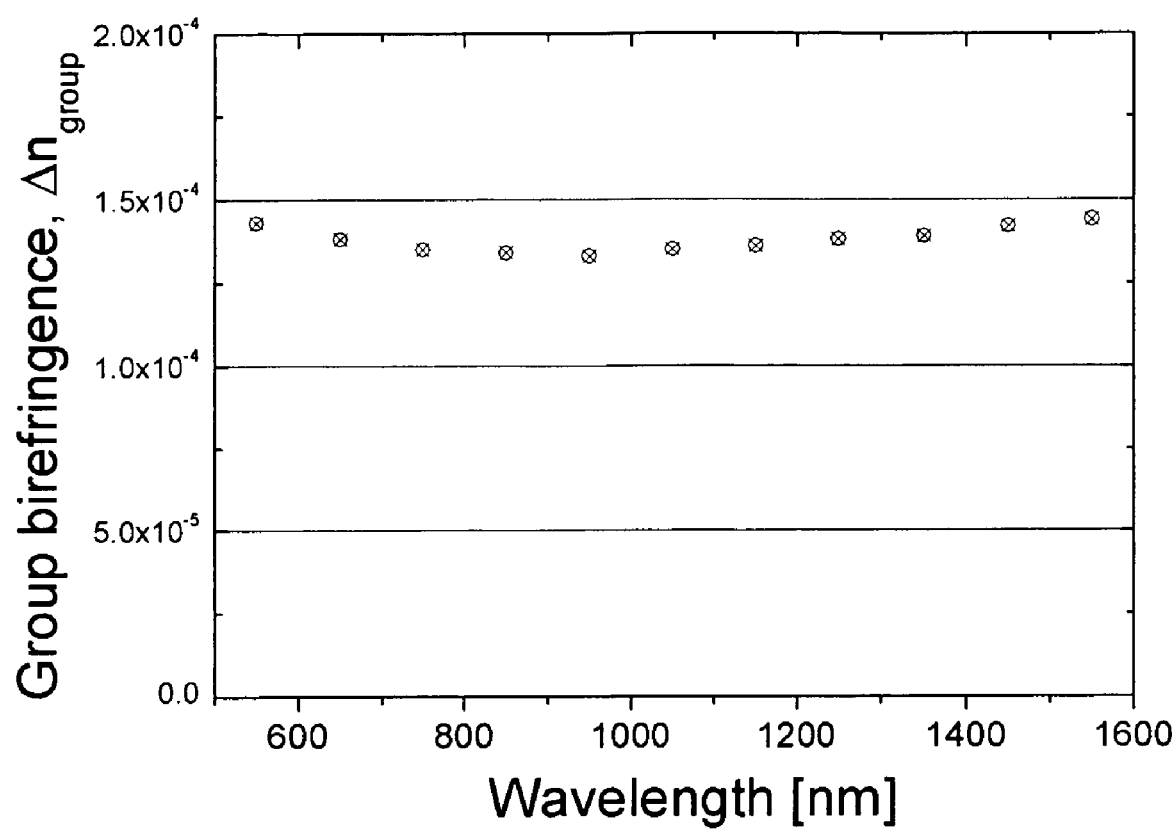
FIG. 4 shows the measured group birefringence as a function of wavelength for the fibre shown in FIG. 2.

In FIG. 4 the measured group birefringence of the fibre in FIG. 2 is shown using the technique discussed in Folkenberg et al, Opt. Express, vol. 12, no. 5, p. 956, 2004. The birefringence is substantially constant in the measured spectral range. For the geometry and composition of the SAP regions in the realized fibre, the calculated birefringence of a similar solid-glass PANDA fibre is $1 \cdot 10^{-4}$. Hence, the birefringence is in fact enhanced by approx. 40%, which is attributed to the presence and geometry of the holes.

The realized fibre shown in FIG. 2 may also be used as a polarizing fibre, that is a fibre where the attenuation of the two polarization states of the fundamental mode is significantly different. For a fibre similar to the one in FIG. 2, but without SAPs, the difference between the effective index of the guided mode, $n_{mode}$, and the effective index of the cladding, $n_{eff}$ defines the $V_{PCF}$-parameter for the fibre at a specific wavelength, $\lambda$:

$$V_{PCF} = \frac{2\pi\Lambda}{\lambda} \sqrt{n_{mode}^2 - n_{eff}^2}$$

For large values of $\Lambda/\lambda$, $V_{PCF}$ is practically constant. Thus for short wavelengths, the difference $\Delta n = n_{mode} - n_{eff}$ becomes small. The two polarization states of the fundamental mode are degenerate in this case. When the SAPs are included in the fibre, the degeneracies of the polarization states are split, leading to a modal birefringence of $B_{mode}$. If $B_{mode}$ is comparable to $\Delta n$, the index of one of the polarization states will be reduced below the effective index of the cladding, and thus this mode will have a high attenuation or become anti-guiding.

Figure 22:
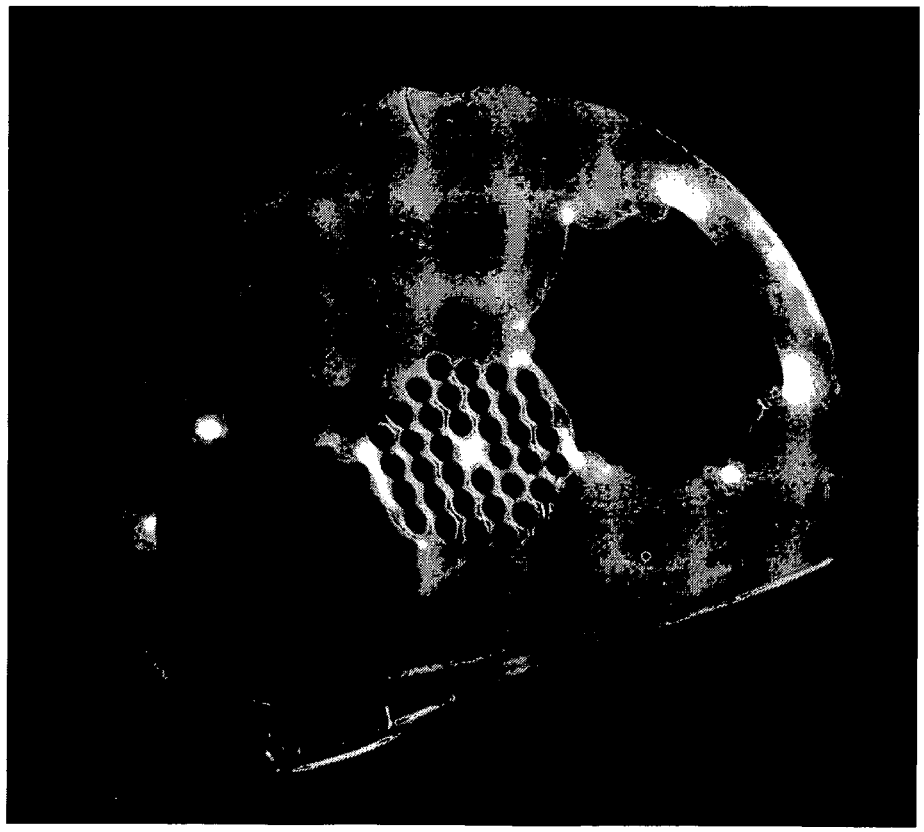
FIG. 22 shows a cross sectional image of a preferred embodiment of a polarizing fibre. The geometrical fibre parameters are $\Lambda=13$ micron, $d_{SAP}=99$ micron, $r_1=41$ micron, $r_2=140$ micron and $b=170$ micron.
Figure 23:
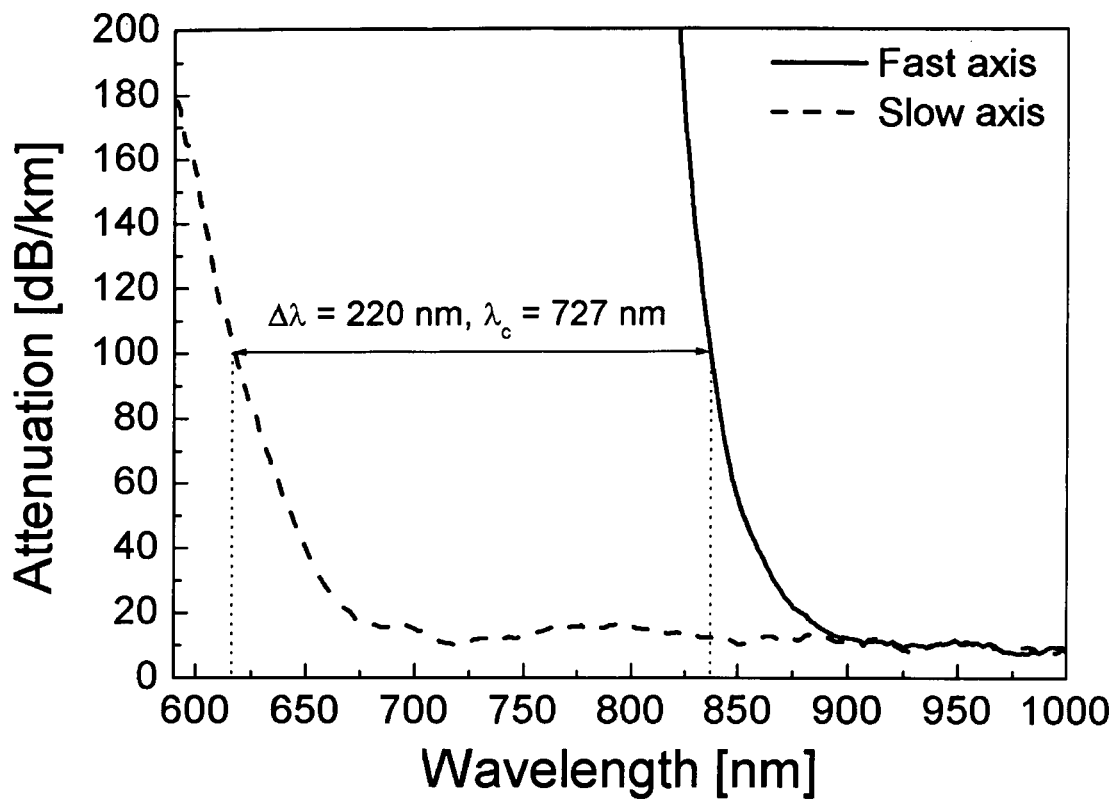
FIG. 23 shows the attenuation spectra for the fast and slow axis of the fibre shown in FIG. 22, yielding a polarizing region with a width of 220 nm and a centre wavelength of 727 nm. The measurement was obtained for a bending radius of R=16 cm.
Figure 24:
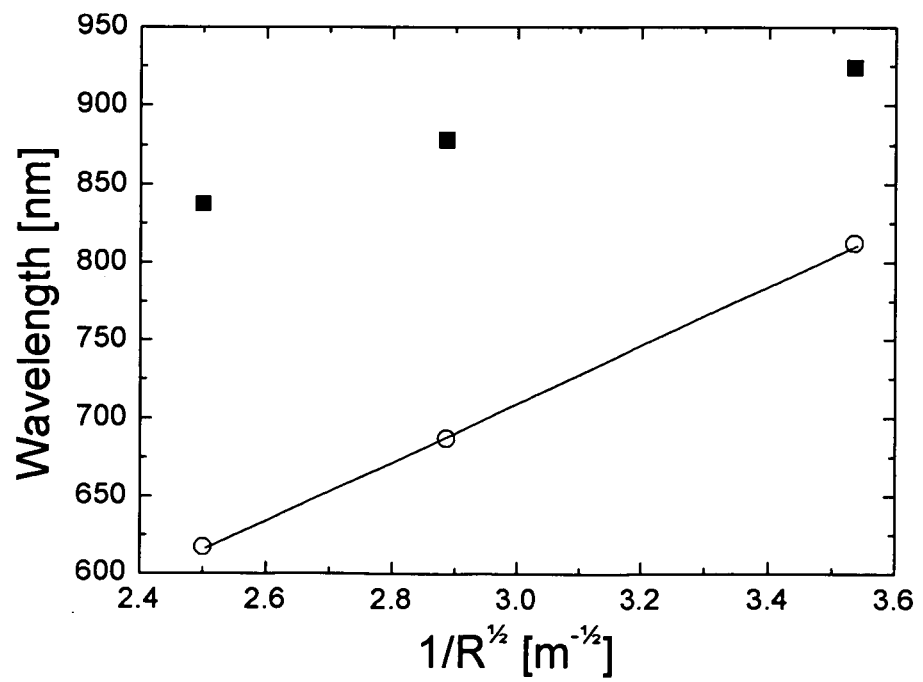
FIG. 24 shows the wavelengths corresponding to 100 dB/km attenuation for the slow (open circles) and fast axis (solid squares) of the fibre in FIG. 22 as a function of $1/R^{1/2}$, where R is the bending radius.

An example of a polarizing fibre according to an embodiment of the invention is shown in FIG. 22, where $\Lambda$=13 micron, $d/\Lambda$=0.50, $d_{SAP}$=99 micron, $r_1$=41 micron, $r_2$=140 micron and $d_{fibre}$=340 micron. The SAPs are VAD processed B/Ge-doped silica rods from Shin-Etsu Chemical Co., Ltd., Tokyo, Japan. The attenuation spectrum of this fibre is shown in FIG. 23 for the two orthogonal polarization states at a bending radius of 16 cm. The spectrum shows a spectral region between approx. 600 nm and 800 nm, where only the slow axis is guided with low losses. For wavelengths longer than 800 nm the fibre is polarization maintaining, guiding both polarization states with a measured group birefringence of $2.9 \cdot 10^{-4}$. For $\lambda$=750 nm, $\Lambda$=13 micron and $V_{PCF}$=π, the relation above yields $\Delta n = n_{mode} - n_{eff} = 2.9 \cdot 10^{-4}$, so the condition $\Delta n \approx B_{mode}$ is satisfied in the polarized spectral region. If the polarizing region is defined between the wavelengths corresponding to an attenuation of 100 dB/km for the slow and the fast axis, the single-polarizing bandwidth, $\Delta\lambda$, is 220 nm and the centre wavelength, $\lambda_c$, is 727 nm. FIG. 24 shows the wavelengths corresponding to 100 dB/km attenuation for the slow (open circles) and fast axis (solid squares) of the fibre in FIG. 22 as a function of $1/R^{1/2}$, where R is the bending radius. As shown in FIG. 24, both $\Delta\lambda$ and $\lambda_c$ depend on the bending radius, R, such that R may be used both to tune the width and the centre position of the polarizing region.

In another preferred embodiment of the fibre shown in FIG. 22, the SAPs have a higher B-doping concentration, yielding a larger birefringence such as $5 \cdot 10^{-4}$ and a broader polarizing region such as $\Delta\lambda$=400 nm.

In another preferred embodiment of the fibre shown in FIG. 22, the relative hole size, $d/\Lambda$ is smaller than 0.5, such as $d/\Lambda$=0.44, which shifts the macro bending losses to longer wavelengths. Thus the polarizing region is broadened and the centre wavelength is shifted to longer wavelengths.

In another preferred embodiment of the fibre shown in FIG. 22, the core index is smaller than the cladding background index, $n_{core} < n_{clad}$. This causes a modal cut-off at short wavelengths, however due to the birefringence the cut-offs of the fast and the slow axis will occur at different wavelengths, yielding a polarizing region in between. This design further allows a smaller mode field diameter at a given wavelength in the polarizing region compared to the design where the core index is equal to the cladding background index, $n_{core} = n_{clad}$.

Figure 5A:
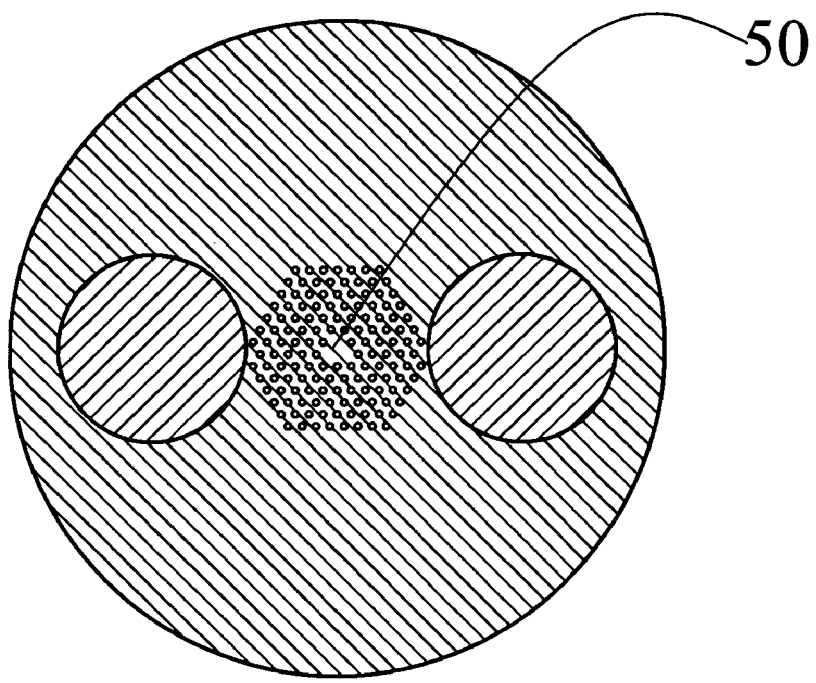
FIG. 5 shows schematic representations of cross sections of two preferred embodiments of a photonic crystal fibre according to the invention, the fibre having a core where, respectively, three (FIG. 5A) and seven (FIG. 5B) air holes have been replaced with solid material.
Figure 5B:
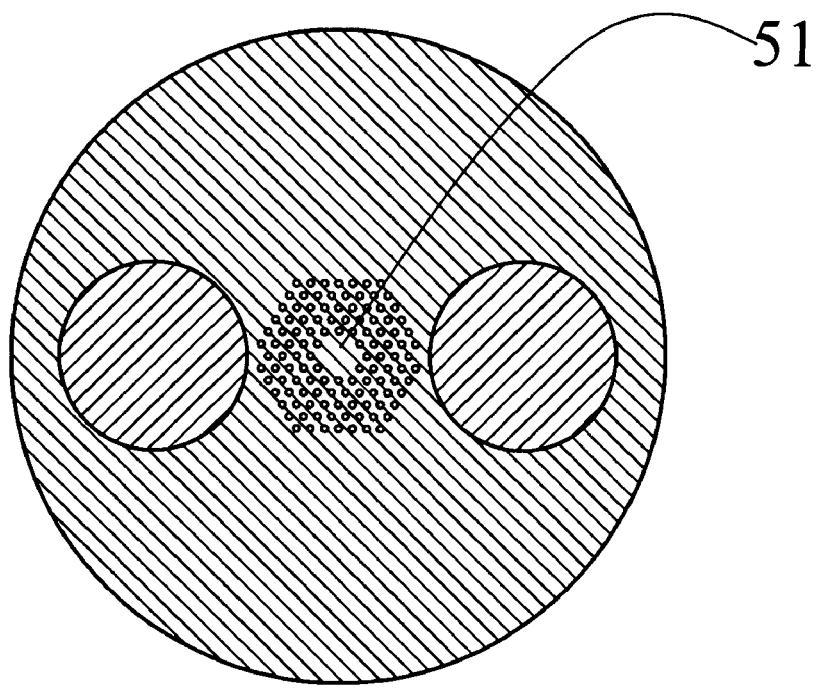

In FIG. 5A and FIG. 5B two other preferred embodiments of photonic crystal fibres according to the invention are shown. In FIG. 5A the core region 50 is formed by replacing three holes or air voids in the cladding with solid silica material, and in FIG. 5B the core region 51 is formed by replacing seven holes or air voids in the cladding with solid silica material. The term 'replacing n holes or air voids in the cladding with solid silica material (or stress elements, see later)' is in the present context taken to mean that in the preform from which the fibre in question is drawn, a core is defined by substituting n solid silica rods (or SAPs) for a corresponding number of capillary tubes of substantially identical outer diameter (thus implicitly assuming that the starting point for forming the preform is a stack of capillary tubes which is then modified to create the actually relevant arrangement of capillary tubes, rods, stress elements, etc.). For $n_{core} = n_{clad} = n_{outer}$ the designs in FIG. 5A and 5B may be single-mode for all guided wavelengths for an appropriate choice of $d/\Lambda$ such as $d/\Lambda$=0.25 for the fibre in FIG. 5A and $d/\Lambda$=0.15 for the fibre in FIG. 5B. Compared to the fibre shown in FIG. 1, robust guidance is achieved with significantly smaller values of d/Λ and thus the influence of the holes on the stress field is expected to be different, than in the fibre shown in FIG. 1.

In another preferred embodiment of the fibre, the core index is smaller than the cladding background index, $n_{core} < n_{clad}$. This fibre design becomes anti-guiding at short wavelengths, however the cut-off of the two polarization states is different.

In another preferred embodiment of the fibre, the core index is larger than the cladding background index, $n_{core} > n_{clad}$. This fibre design becomes multi-moded at short wavelengths. However, at long wavelengths, single-mode guidance is obtained using a smaller relative hole size, d/Λ, and thus the influence of the holes on the stress field will be different, than in the fibre shown in FIG. 1.

In another preferred embodiment of the fibre, the core is doped with rare earth ions, such as Er, Yb, Nd, Ho, Sm or Tm. The core index may by lower or higher than the cladding index.

Figure 15:
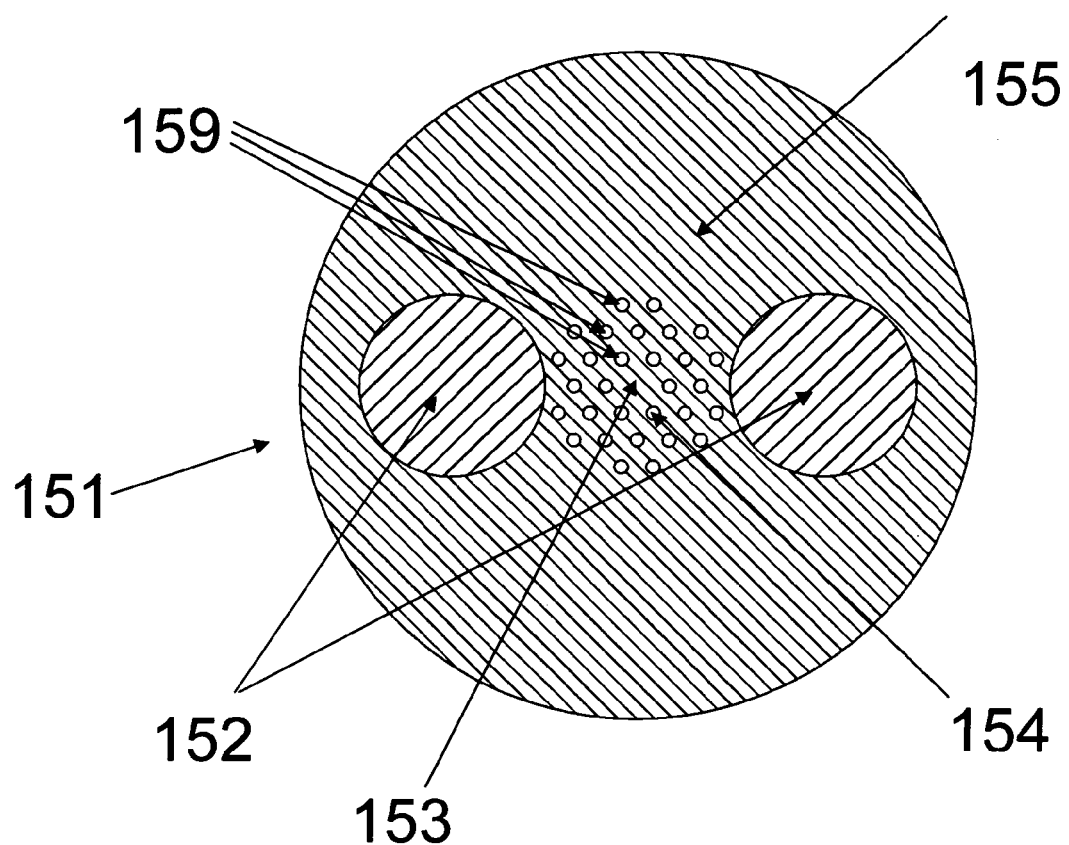
FIG. 15 shows a schematic cross section of a photonic crystal fibre, with a low number of rings of air holes around the core. In this embodiment two full rings and 12 of 18 possible holes in the third ring are included.
Figure 16:
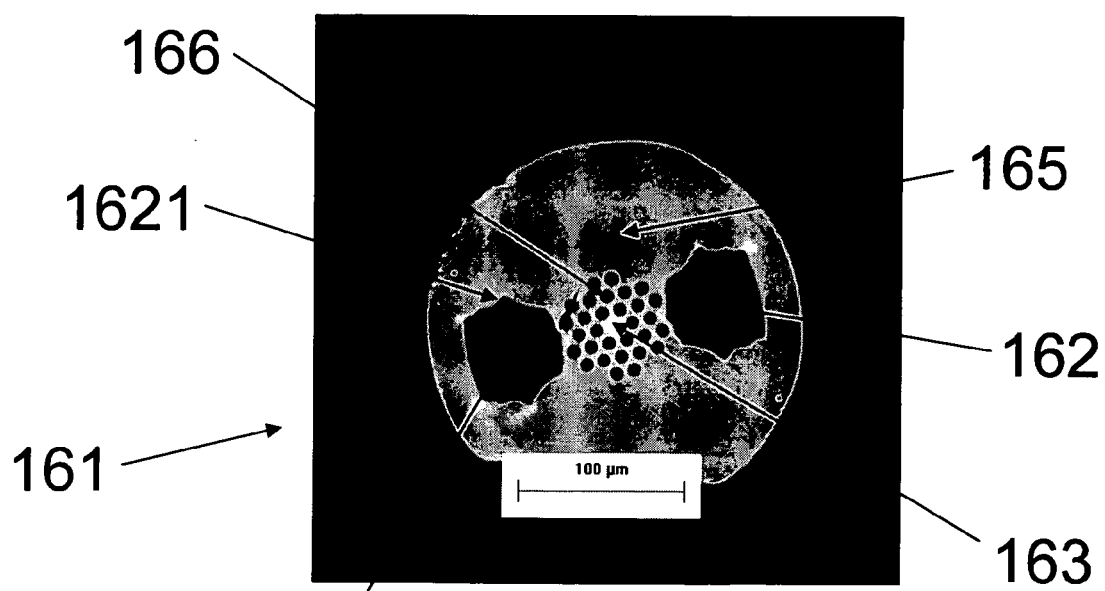
FIG. 16 shows a scaled photomicrograph of a realized fibre in accordance with the drawing in FIG. 15.

FIG. 15 shows a schematic drawing of a photonic crystal fibre 151 according to a preferred embodiment of the present invention. The fibre comprises a core region 153, a first cladding region surrounding the core region and comprising a pattern of micro-structural elements (air holes) 154, a second cladding region 155 surrounding the first cladding region, and two stress elements 152 symmetrically located in the second cladding region around the centre of the core region. The fibre 151 has a relatively low number of rings 159 of air holes 154 between the SAP regions 152 and the core 153 (in FIG. 15, 3 rings). In a preferred embodiment, the number of rings 159 is around 2 to 3. Preferably, the number of air holes is between 15 and 40, such as between 18 and 36. A scaled photomicrograph of a real fibre 161 is shown in FIG. 16. The cross-sectional dimensions of the structure are $d_{fibre}$=230 μm, Λ=10.8 μm, d/Λ=0.49. The core region 163, the cladding region 166 and the outer region 165 are made of pure silica, such that $n_{core}=n_{clad}=n_{outer}$. The SAP regions 162 are made of B-doped and Ge-doped silica, with dopant concentrations of 14-17 mole % $B_2O_3$ and 3-4 mole % $Ge_2O_3$. Due to the production process, the border 1621 of the SAP region is not circular. The SAP regions may be approximated by circles having the same area and centre of mass as the SAP regions in FIG. 16. The equivalent circles corresponding to the SAP region in FIG. 16 are given by $d_{SAP}$=60 μm, $r_1$=33 μm and $r_2$=92 μm, $r_1$ and $r_2$ having the meaning defined in connection with FIG. 1.

Figure 17:
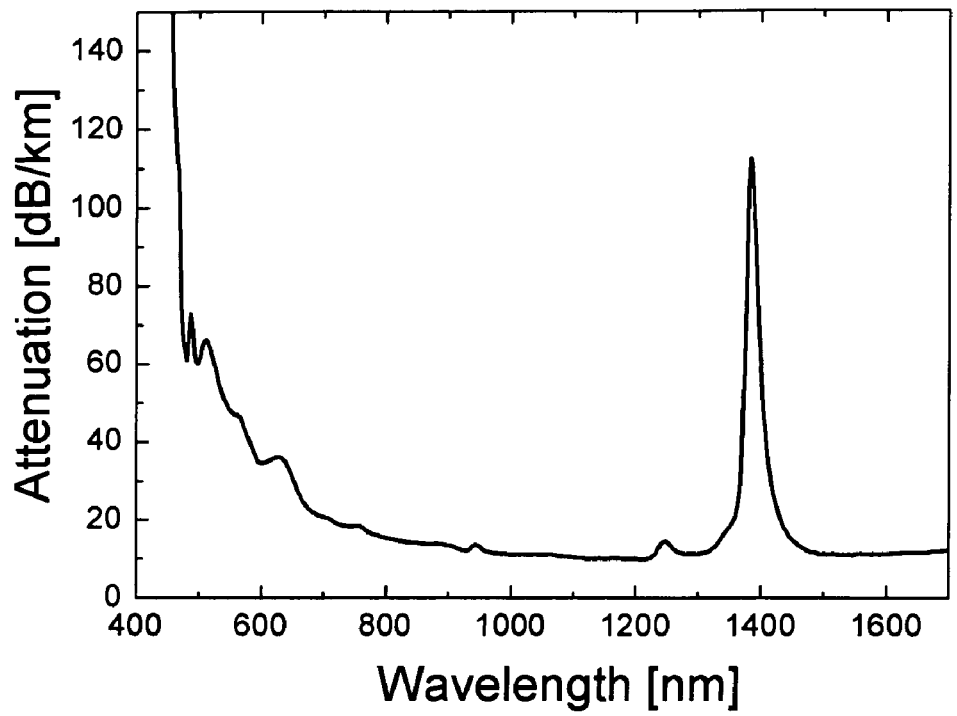
FIG. 17 shows the measured attenuation spectrum of the fibre shown in FIG. 16 for a bending radius of 16 cm.

FIG. 17 shows the spectral attenuation of the fibre shown in FIG. 16, measured by the cut-back technique on a spool with a diameter of 32 cm. It is noted that although the number of air holes (here 30 air holes) in the cladding has been reduced compared to the fibre in FIG. 2 (60 air holes), the attenuation is substantially the same, and the difference may be attributed to the cleanliness of the present production process. The increase of losses at short wavelengths, λ<700 nm, is due to macro-bending losses.

Figure 18:
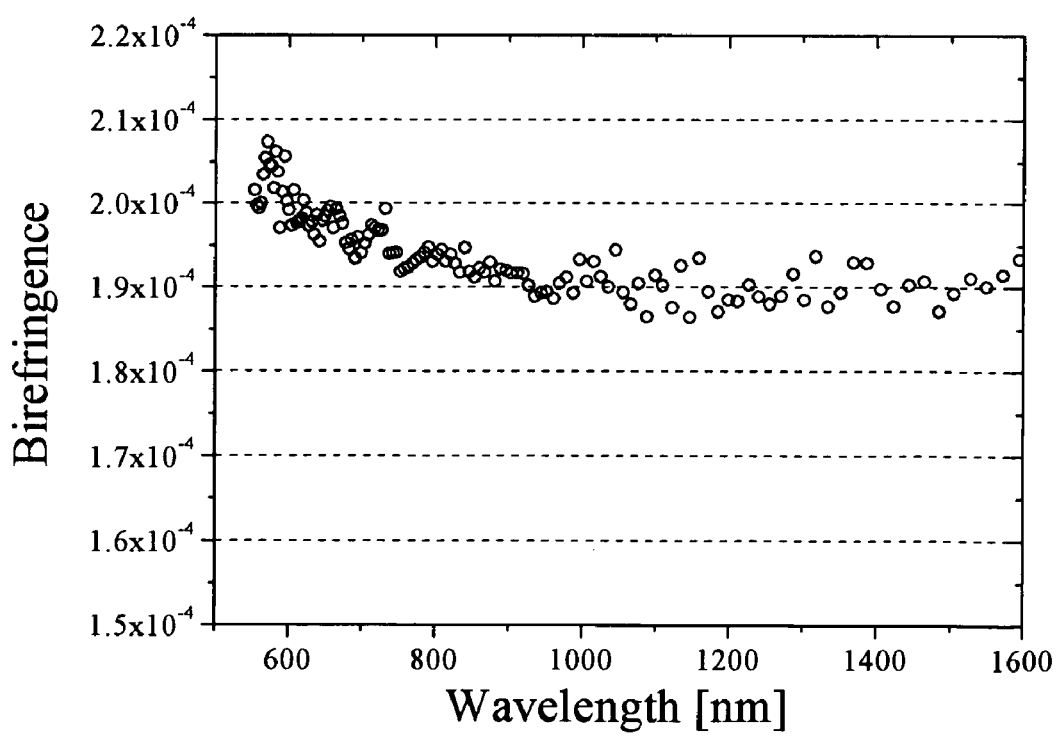
FIG. 18 shows the measured group birefringence of the fibre shown in FIG. 16 in the spectral range from 500 nm to 1600 nm.

In FIG. 18, the measured group birefringence of the fibre shown in FIG. 16 is plotted. The birefringence is between $1.9 \cdot 10^{-4}$ and $2.1 \cdot 10^{-4}$ in the measured spectral range between 600 and 1600 nm. The increase of the birefringence compared to the fibre in FIG. 2, is due to a change of the strain field in the core caused by the combination of A) fewer air-holes between the SAP region and the core and B) a 30 degree rotation of the microstructure in the cladding region.

Figure 19:
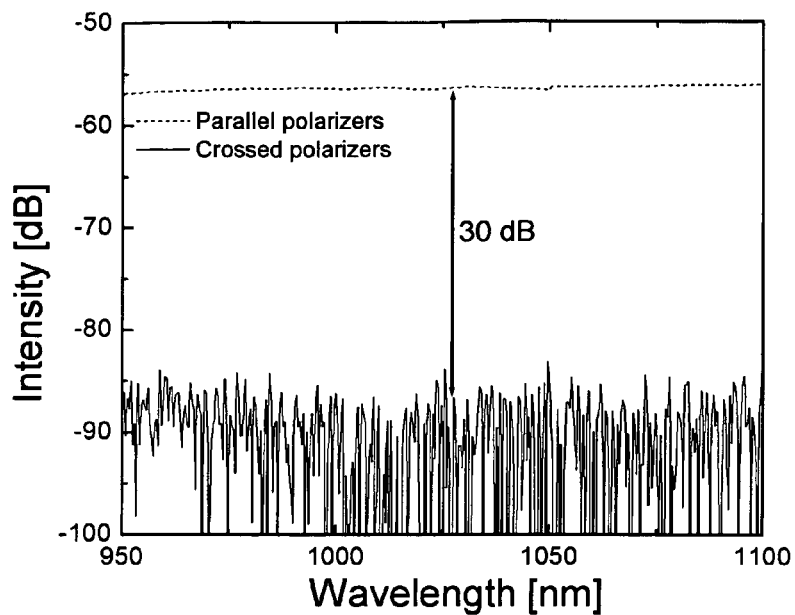
FIG. 19 shows the measured polarization extinction ratio of the fibre shown in FIG. 16 in the spectral range from 950 nm to 1100 nm.

In FIG. 19 a measurement of the polarization extinction ratio is shown for λ=950-1100 nm. The light is launched into one of the polarization states using a linear polarizer and after 90 m of fibre the transmitted light in each of the polarization states is measured using a second polarizer (the analyzer). The polarization extinction ratio is 30 dB or larger, however the measurement is limited by the dynamic range of the spectrum analyzer. This corresponds to a polarization holding parameter of less than $h=1.1 \cdot 10^{-5}$ m$^{-1}$.

Figure 20:
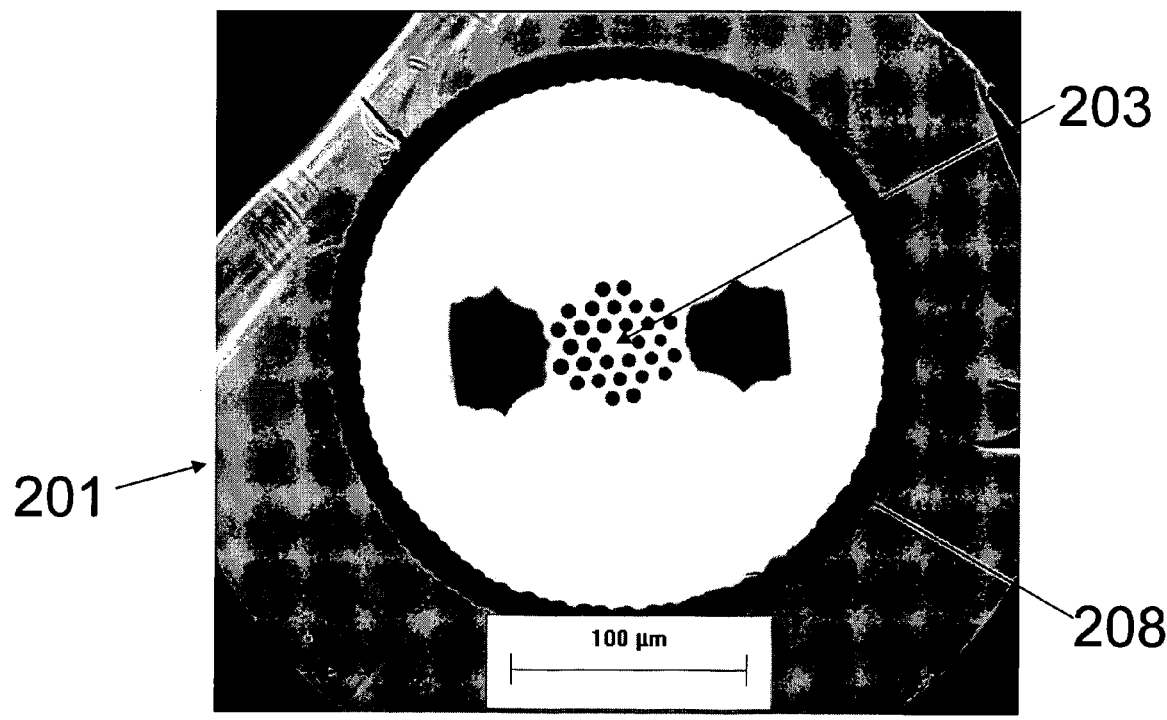
FIG. 20 shows a scaled photomicrograph of a passive double cladding fibre based on the fibre shown in FIG. 15.

The fibre design shown in FIG. 15 compared to the design in FIG. 1, allows a larger core size for a fixed cladding diameter of the fibre. The compactness of the design, is advantageous e.g. for double cladding fibres, where it allows a large polarization maintaining core inside a small-diameter inner cladding (also known as pump core or pump guide). An example of a passive version of such a fibre 201 is shown in FIG. 20, where the pump guide diameter (i.e. the diameter of the part of the fibre within the air cladding 208) is 227 micron, Λ=9.2 μm and d/Λ=0.50. In a preferred embodiment, the core 203 comprises an active material.

Figure 21:
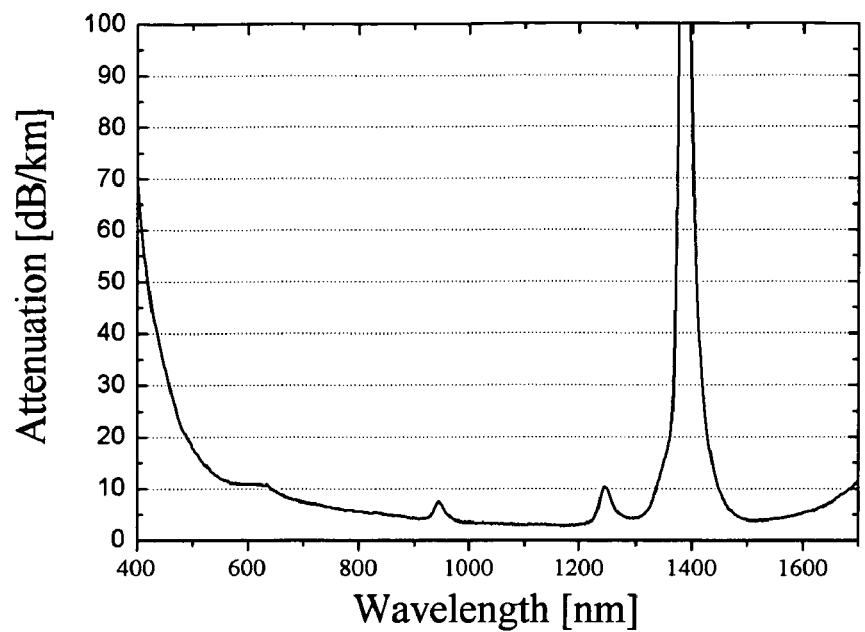
FIG. 21 shows the measured background attenuation of the multi-mode pump guide in the passive double cladding fibre shown in FIG. 20.

FIG. 21 shows the measured background attenuation of the pump guide of the fibre shown in FIG. 20. The absorption peaks in the spectrum are attributed to OH-contamination of the background material, and otherwise the attenuation level is similar to pump guide structures without SAPs inside.

Figure 26A:
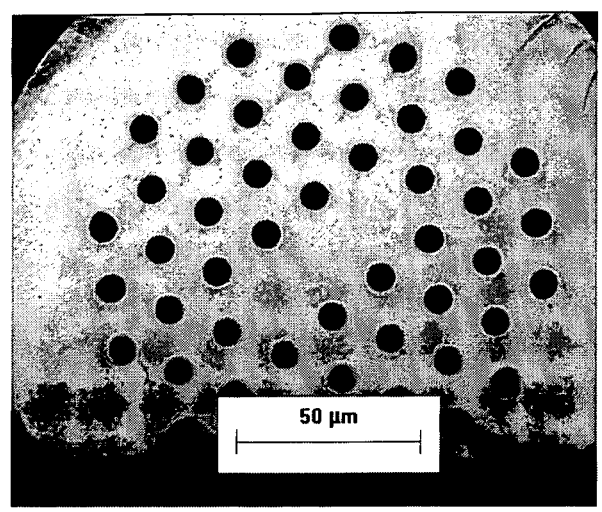
FIG. 26 shows microscope images of a fibre according to the invention, with two SAP regions located within the cladding region, next to the fibre core. In the reflected light image shown in FIG. 26A, the SAP regions are barely visible, due to the small index contrast relative to pure silica. In the transmitted light image shown in FIG. 26B, the SAP region appears similar to an air void in the cladding, because light is not guided in the SAP region.
Figure 26B:
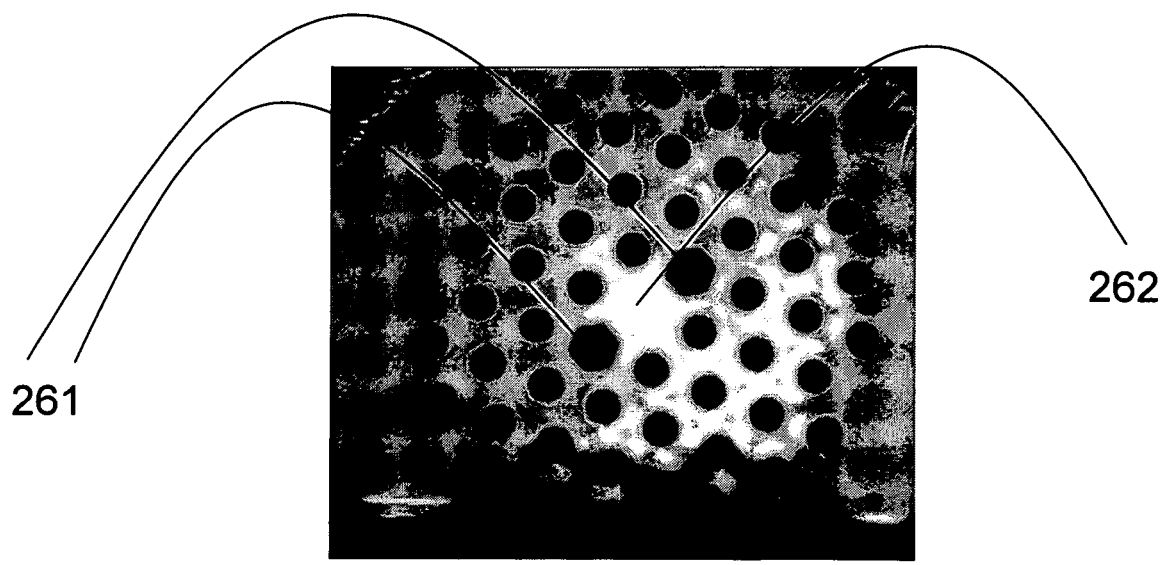

In another preferred embodiment of the invention, the SAPs are placed inside the first cladding region to reduce the fibre diameter compared to the design shown in FIG. 2, while maintaining the same core size. An example of a fibre according to this embodiment is shown in FIG. 26A and FIG. 26B, where two holes on opposite sides of the core have been replaced by SAPs. The SAPs contain boron-doped silica with a $B_2O_3$ concentration of 14-17 mole % with a refractive index $7 \cdot 10^{-3}$ lower than pure silica. The geometrical parameters of the air voids are Λ=16.4 μm and d/Λ=0.46, and $d_{fibre}$=190 μm. The diameter of the boron-doped regions is $d_{SAP}$=0.7Λ, yielding $r_1$=10.7 μm, $r_2$=22.2 μm and $d_{SAP}$=11.5 μm (cf. FIG. 1). In FIG. 26A the fibre is illuminated from above, so an image of the reflected light is shown. Because of the small index contrast between pure silica and the boron-doped silica, the SAPs cannot be distinguished from the core region. However, when illuminated from below as shown in FIG. 26B, the SAPs are clearly visible as dark regions 261 next to the core 262. In fact, since the SAPs have a lower refractive index than silica they act like a hole in the structure and may likewise be utilized to confine the light.

Figure 27:
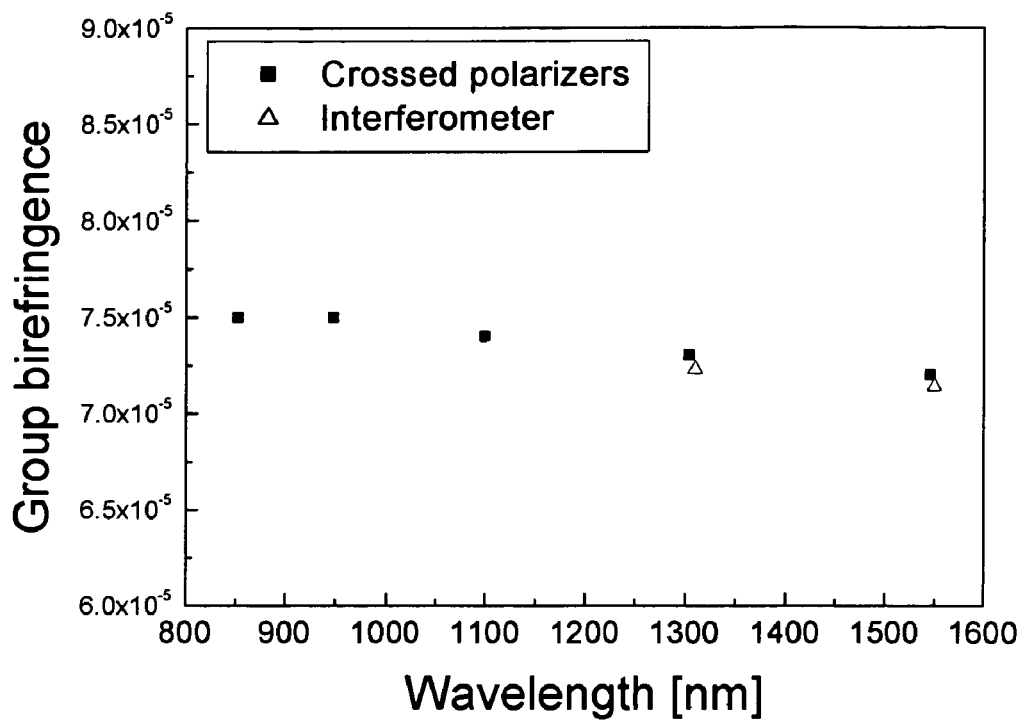
FIG. 27 shows the measured group birefringence of the fibre shown in FIG. 26, as a function of wavelength.

In FIG. 27 the measured group birefringence is plotted as a function of wavelength for the fibre shown in FIG. 26A and FIG. 26B. The group birefringence has been measured using the same technique as for the results in FIG. 4 and FIG. 18. Additionally, an interferometric technique in accordance with the TIA/EIA FOTP-124 measurement standard has been used at 1310 nm and 1550 nm, and yields the same results. The calculated birefringence, using $r_1$=10.7 μm, $r_2$=22.2 μm, $d_{SAP}$=11.5 μm and $d_{fibre}$=190 μm, is $B_{mode}$=0.7·10$^{-4}$ which is in good agreement with the experimental data, and indicates very little influence from the holes in the structure. This is expected, since there are no holes between the SAPs and the core.

Figure 28:
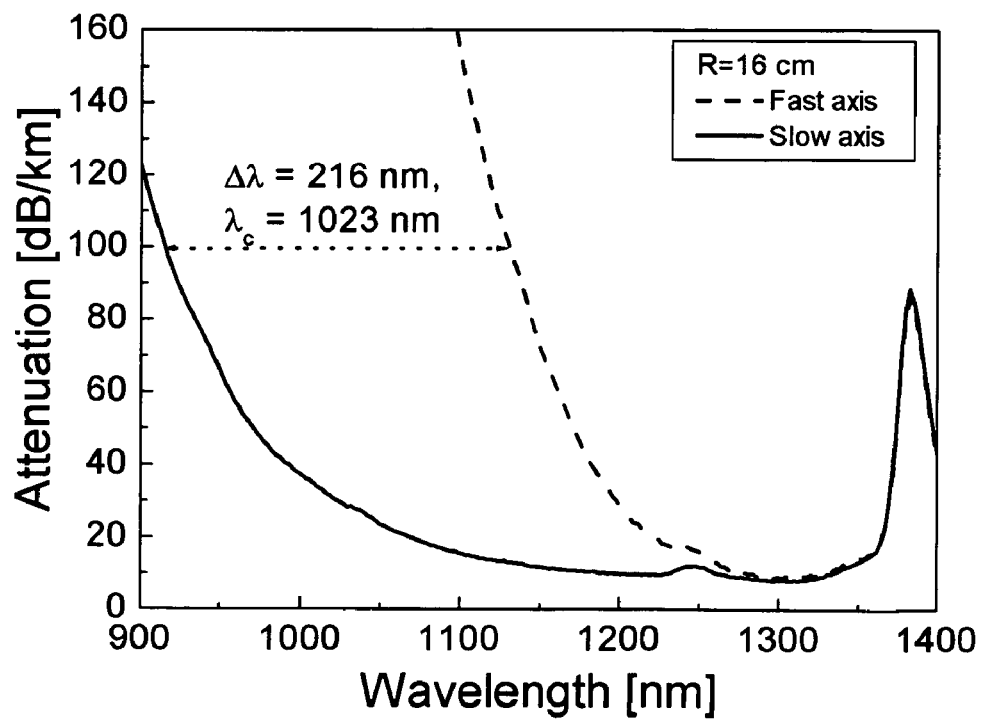
FIG. 28 shows the measured spectral attenuation of the fibre shown in FIG. 26, for the fast and the slow polarization state. The wavelengths corresponding to an attenuation of 100 dB/km is used to define a polarizing band, 216 nm wide and cantered at 1023 nm.

In FIG. 28 the measured attenuation for the fast and the slow axis of a fibre similar to the one in FIG. 26A and FIG. 26B is shown. The attenuation spectrum shows a polarizing region which is cantered at $\lambda_c$=1023 nm and is Δλ=216 nm wide, when defined at the wavelengths corresponding to 100 dB/km attenuation. The spectral features at 1240 nm and 1390 nm are due to OH-contamination of the silica. For Λ=16.4 μm and d/Λ=0.46, a value of $\Delta n = n_{mode} - n_{eff}$=3.4·10$^{-4}$ is obtained using the relation given above.

Thus, compared to the fibre design shown in FIG. 22 it is noted that a similar value of $\Delta\lambda/\lambda_c$ is obtained with a lower value of the birefringence. That is, a polarizing fibre may be obtained even for $B_{mode} < \Delta n$.

In a preferred embodiment of the invention shown in FIG. 26A and FIG. 26B, the SAP regions are larger or have a higher boron-concentration, in order to further increase the birefringence.

Figure 6A:
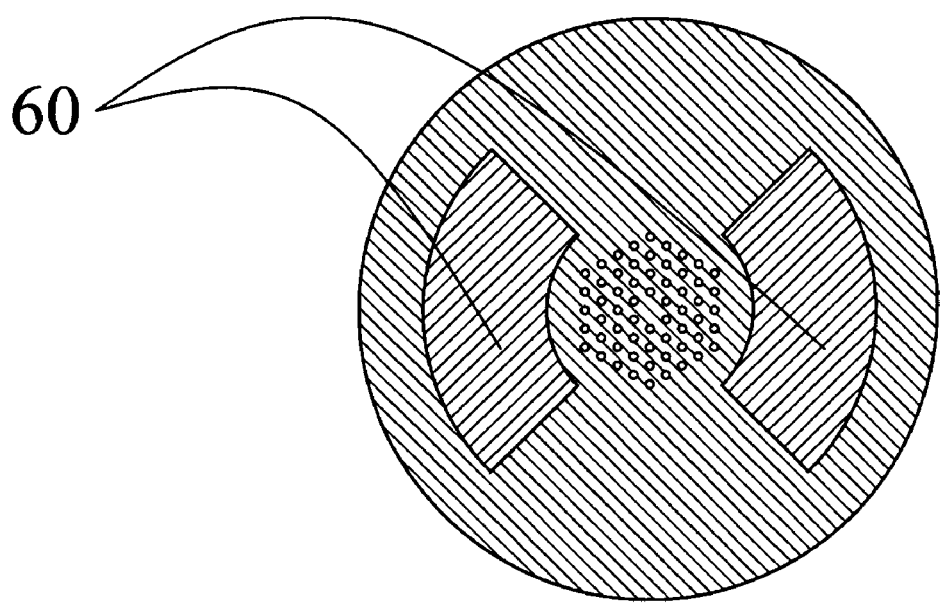
FIG. 6 shows schematic representations of cross sections of two preferred embodiments of a photonic crystal fibre according to the invention, where different shapes of the stress applying parts have been used, in FIG. 6A and FIG. 6B in the form of ring segments and D-shapes, respectively.
Figure 6B:
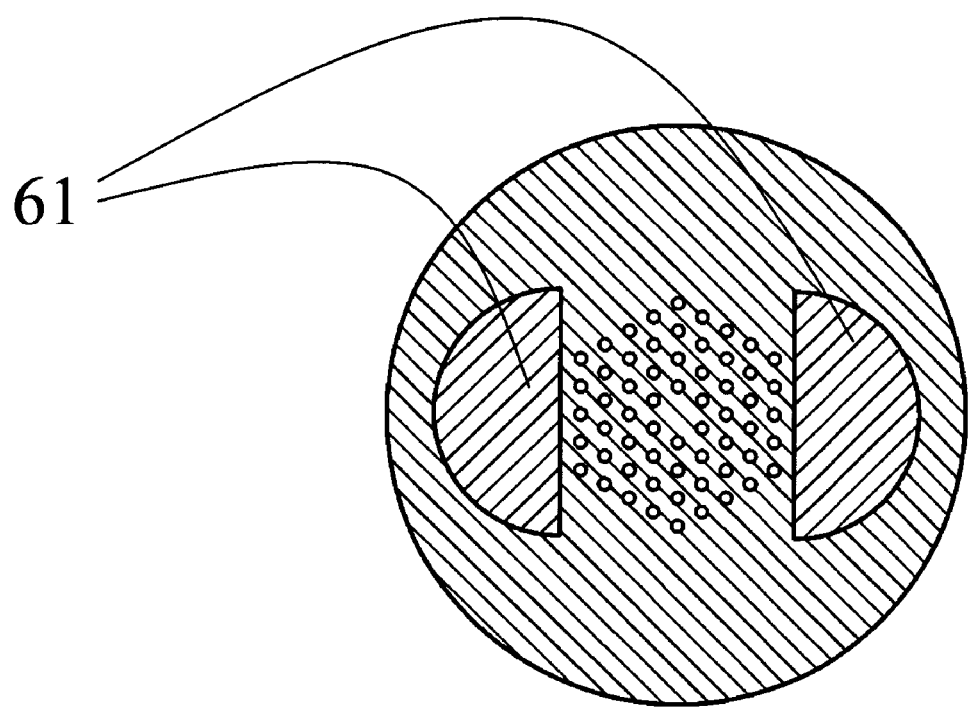

FIG. 6 shows two other possible realizations of photonic crystal fibres according to the invention, using SAP regions with shapes significantly different from circular. In FIG. 6A the SAP regions 60 are similar to those of so-called bow-tie polarization maintaining fibres. In this realization, the SAP regions 60 are shaped like sections of a ring, concentric with the fibre core. In FIG. 6B the SAP regions 61 are shaped like a "D". The "D" shape may for example be done using polishing or grinding of the stress elements.

Figure 7:
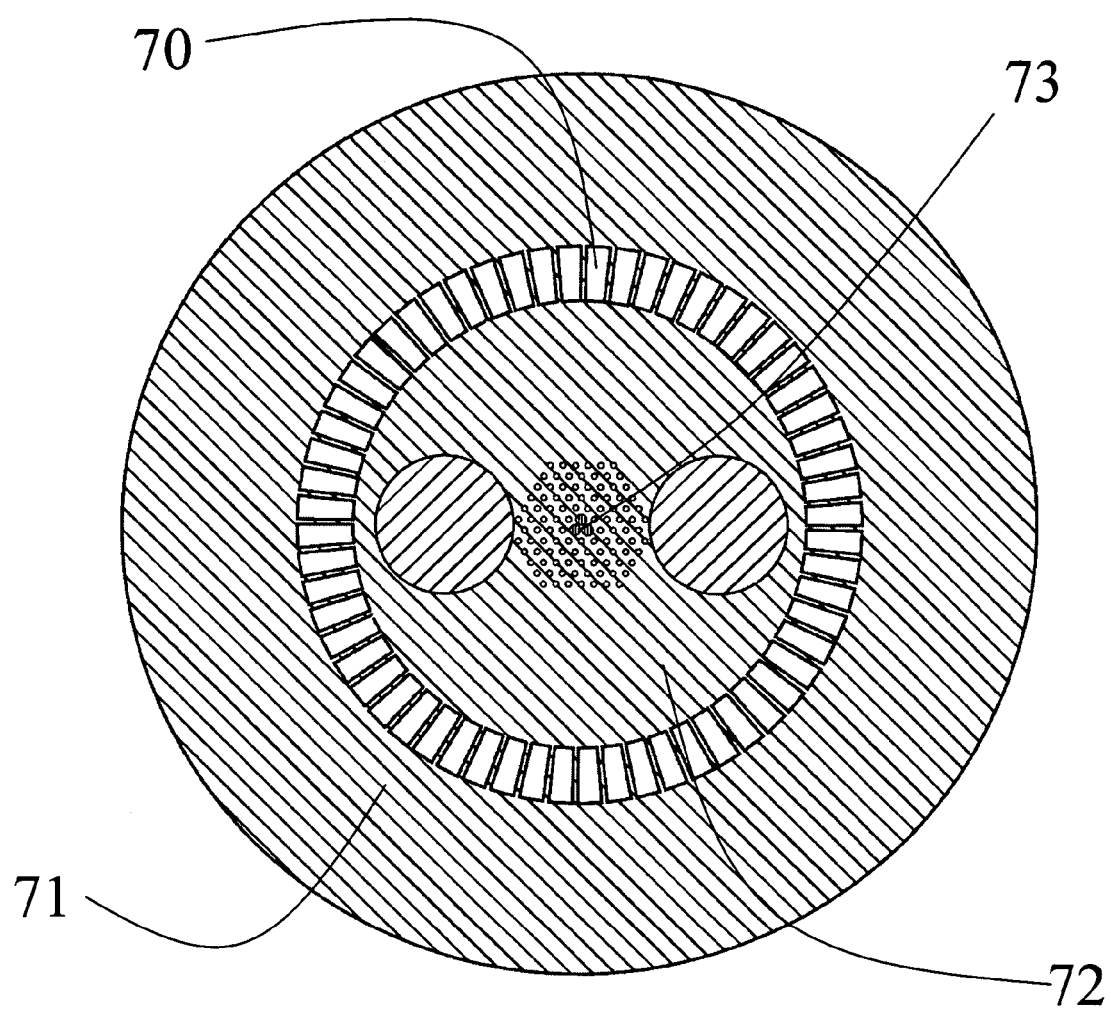
FIG. 7 shows a schematic representation of a cross section of a preferred embodiment of a photonic crystal fibre according to the invention, the fibre being a multi cladding fibre, where a core region, surrounded by a first cladding region comprising micro-structural elements, again surrounded by a second cladding region comprising 2 opposite stress elements is surrounded by an intermediate air cladding region, which again is surrounded by an outer cladding region.

For the use of the invention for so-called double-cladding fibre, the realization shown in FIG. 7 is well suited. In this design the fibre design shown in FIG. 1 is surrounded by a ring of air holes 70, the so-called air cladding. See e.g. [Bjarklev et al.] for further details on fabrication etc. Outside the air cladding a solid region 71 of silica is placed, the so-called outer cladding. The region within the ring of air holes is termed the inner cladding 72 (comprising first and second inner cladding regions). Because of the low effective index of the air cladding, the inner cladding forms a multimode waveguide with a very high numerical aperture. Hence, the inner cladding may guide light with a high brightness, e.g. launched from a multimode laser pump diode.

The double cladding fibre in FIG. 7, may act either as a laser or as an amplifier. Because of the SAP regions around the fibre core 73, the output of the laser or amplifier may have a well-defined polarization state. This is a desired property, e.g. for polarization multiplexing of two laser outputs or for generation of higher harmonics of the output wavelength in a non-linear crystal. The fibre core 73, having 3-fold rotational symmetry, may be fabricated from a preform having three centrally located solid rods surrounded by appropriate cladding elements, stress elements, etc.

Any of the embodiments of photonic crystal fibres according to the invention in FIGS. 1, 2, 5, 6, 9 (i.e. a fibre drawn from this preform), 10, 11, 12, 13, 14, 15, 16, 22 and 26 may be realized with an air cladding and an outer cladding to form a double cladding fibre.

FIG. 10 shows schematic representations of cross sections of two preferred embodiments of a photonic crystal fibre according to the invention, where light is guided due to the photonic band gap (PBG) effect.

Figure 10A:
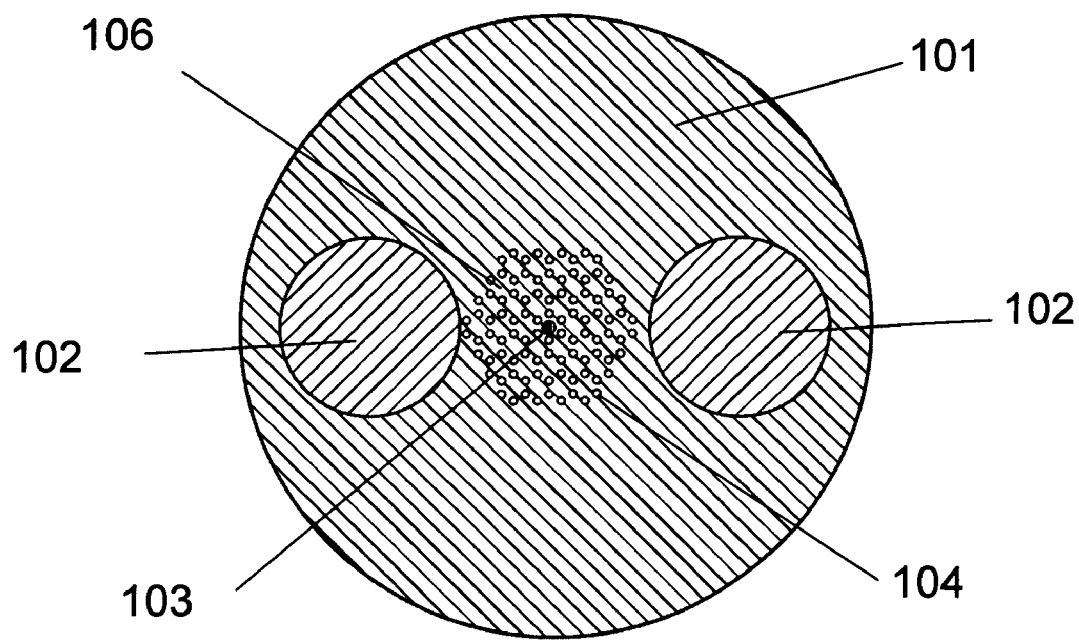
FIG. 10 shows schematic representations of cross sections of two preferred embodiments of a photonic crystal fibre according to the invention, where light is guided due the photonic band gap effect and stress elements are located in a second cladding region, FIG. 10A having a first cladding region comprising hexagonally located voids around a solid core and FIG. 10B further comprising Ge-doped solid elements located between the voids in the first cladding region.
Figure 10B:
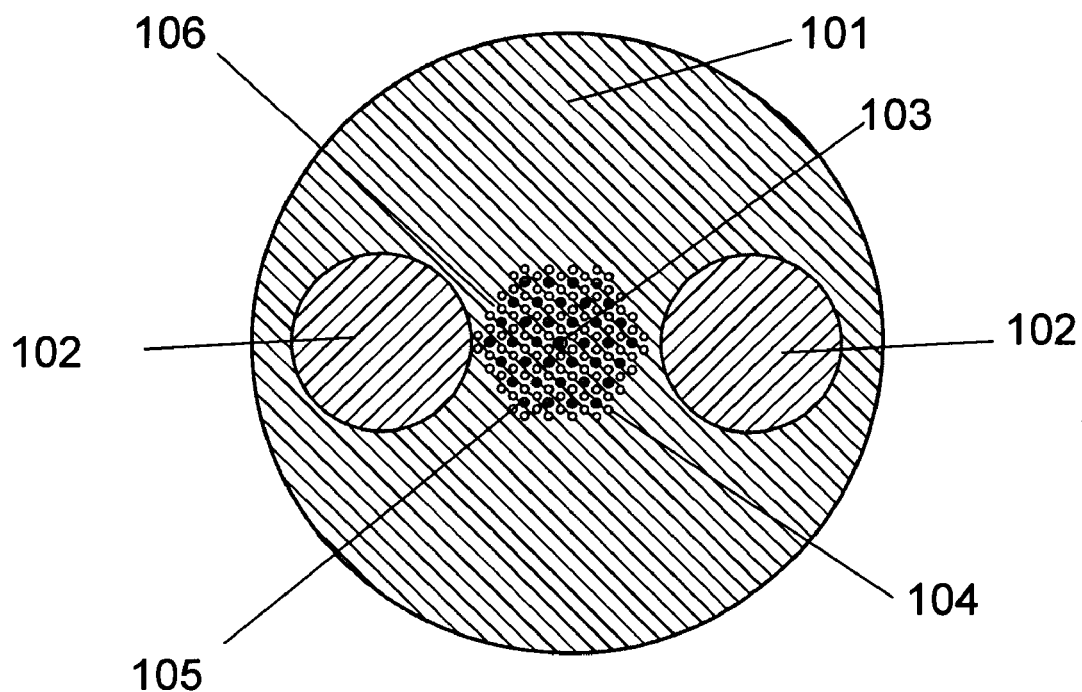

Various types of PBG-fibres are possible. FIG. 10A and FIG. 10B show two examples of PBG-fibres with a honey comb-type arrangement of holes 104 in a first cladding region 106, the holes being arranged in a first cladding background material having a refractive index $n_{cladback}$. The holes 104 are arranged around a solid core region 103 of a material with a refractive index $n_{core}$. In a preferred embodiment $n_{core}$ is smaller than $n_{cladback}$ The embodiments of FIG. 10A and FIG. 10B both have a second cladding region 101 surrounding the micro-structured first cladding region 106 and comprising two stress elements 102 located symmetrically around the core region. The embodiment of FIG. 10B further comprises Ge-doped solid elements 105 located between the voids in the first cladding region. This has the effect/advantage of allowing further control of the optical properties of the fibre.

Since the core is solid, and the air filling fraction of the cladding region may be made relatively low, it is possible to obtain a relatively large strain field in the core region, by placing stress elements (SAPs) outside the first cladding region comprising the holes.

Figure 11:
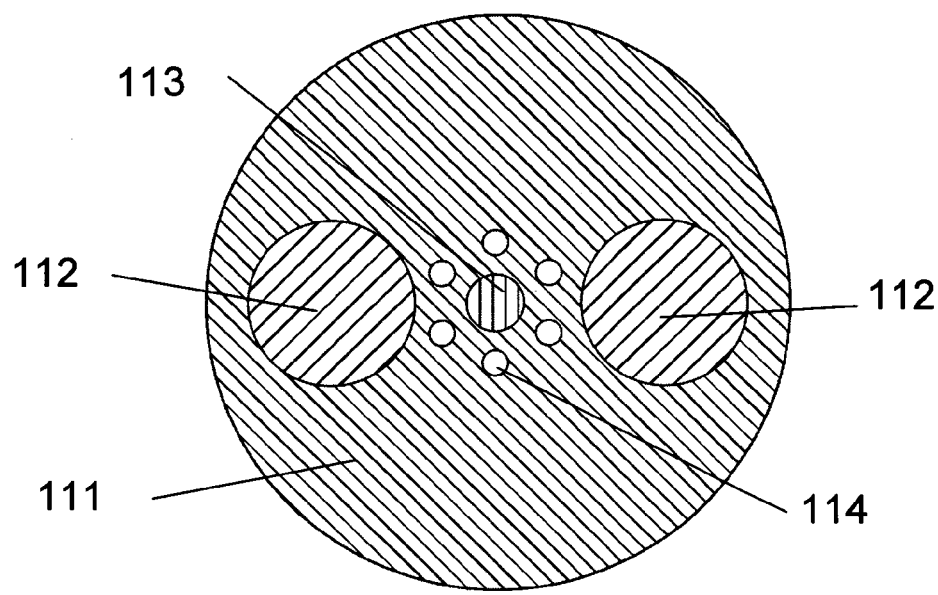

Another preferred embodiment is shown in FIG. 11, where 2 SAPs 112 are placed in the cladding region 111 around 6 hexagonally placed holes 114 around a central, solid core region 113 in a so-called "hole assisted light-guide fibre" (HALF-fibre). In the HALF-fibre, the core region has a higher index than the cladding background index, $n_{core} > n_{clad}$. That is, even without air holes or voids, the core may guide the light. However, the air holes or voids 114 act to further confine the light in the core region 113, and may alter the properties of the waveguide, e.g. the dispersion.

Figure 12:
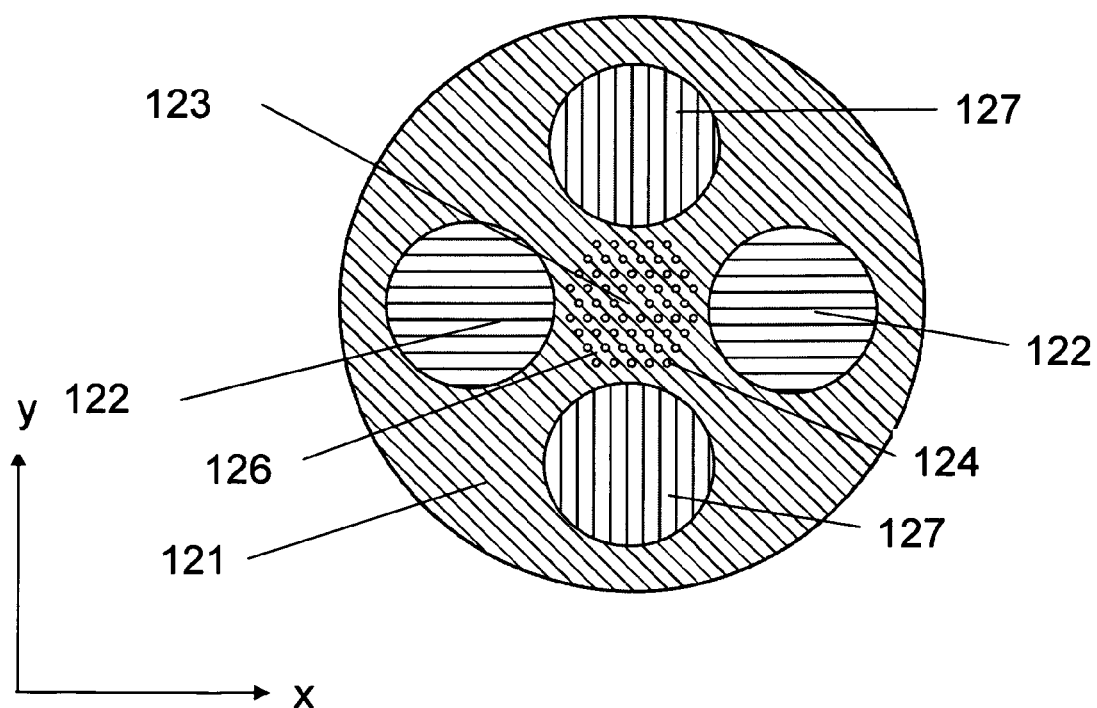
FIG. 12 shows a schematic cross section of a photonic crystal fibre according to the invention, where 4 stress elements are located in a second cladding region, the stress elements comprising different materials.

Another preferred embodiment of the invention is shown in FIG. 12, where two different types of SAP-elements 122, 127 are located in a second cladding region 121 having a coefficient of thermal expansion $\alpha_{cladback}$. The stress elements 122, 127 have different thermal expansion coefficients of, respectively, $\alpha_{T,SAP,1}$ and $\alpha_{T,SAP,2}$. The materials of the SAP elements are chosen such that $\alpha_{T,SAP,1} > \alpha_{cladback}$ and $\alpha_{T,SAP,2} < \alpha_{cladback}$. When the fibre is cooled in the production process, the SAP-elements 122 will apply a tensile strain in the x-direction to the fibre core region 123, while the SAP-elements 127 will apply a compressive strain on the core region 123 in the y-direction. The combination of the two different SAPs will act to enhance the strain in the core compared to a similar design with just one pair of similar SAPs, and thus enhance the birefringence. In the embodiment of FIG. 12, the voids or air holes 124 are arranged in a triangular lattice in a first cladding region 126 around a solid core region 123.

Other embodiments of the invention comprising other combinations of patterns of micro-structured elements and stress elements designed with a view to creating a stress/strain field in the core region to provide birefringence may be provided.

Figure 29A:
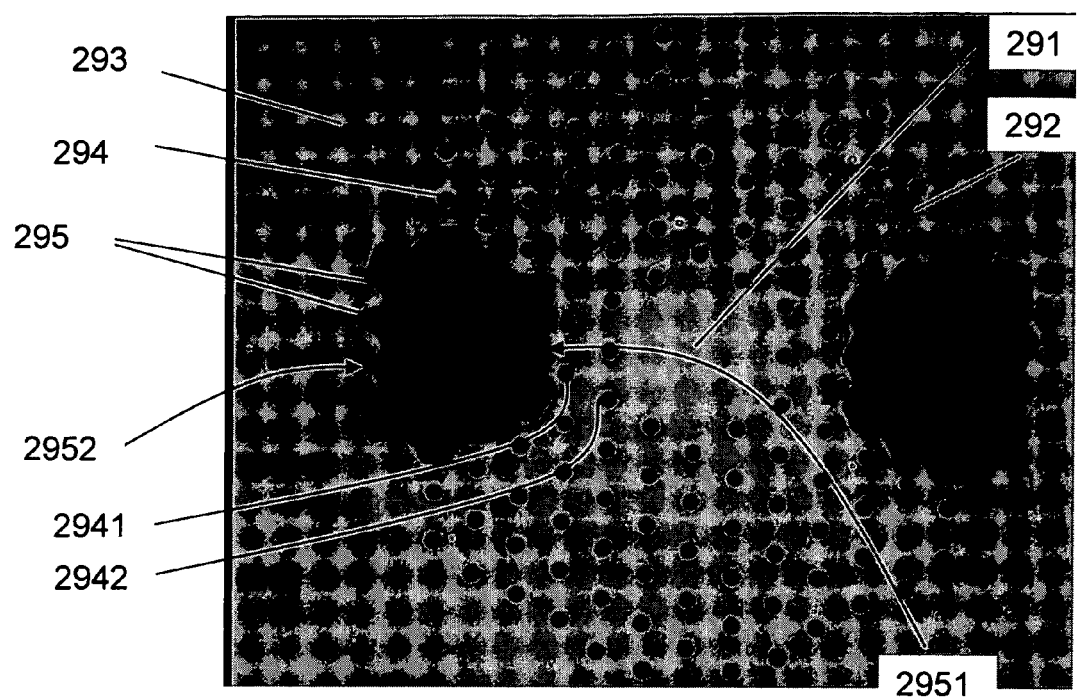
In FIG. 29a, light is introduced from the bottom end—and the picture is taken at the top end. Stress elements have a refractive index that is lower than the background material (pure silica in this case), hence the stress elements appear dark in the photograph.
Figure 29B:
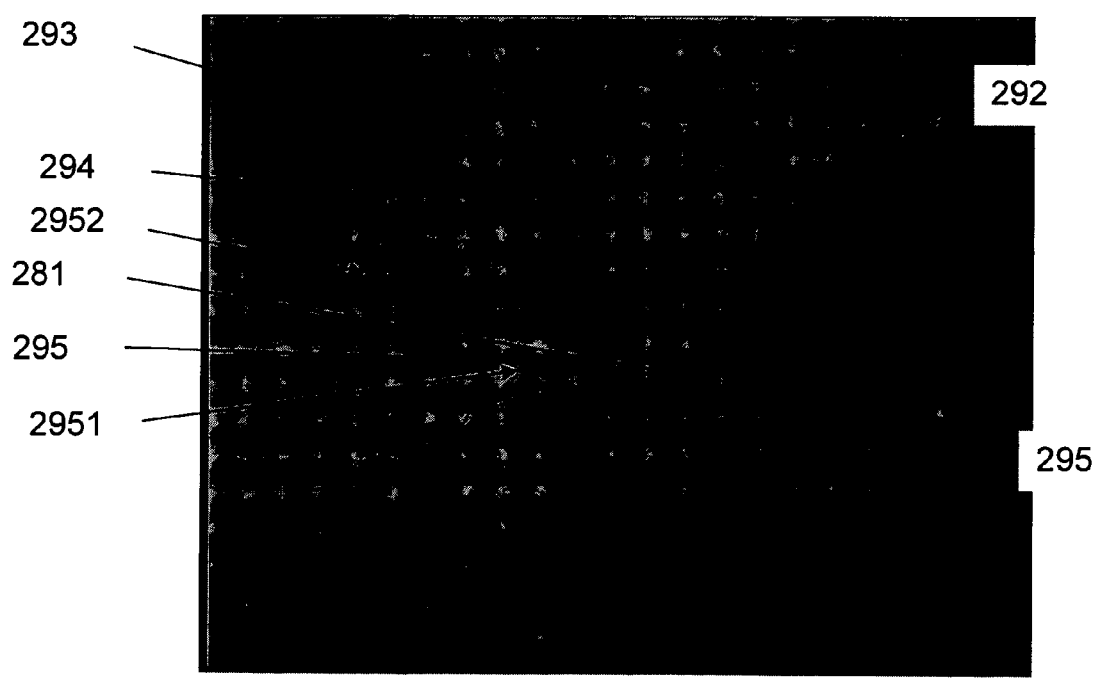
In FIG. 29b, light is introduced from the top end—and the picture is taken at the top end. The stress elements are not seen directly as they are solid.
Figure 30:
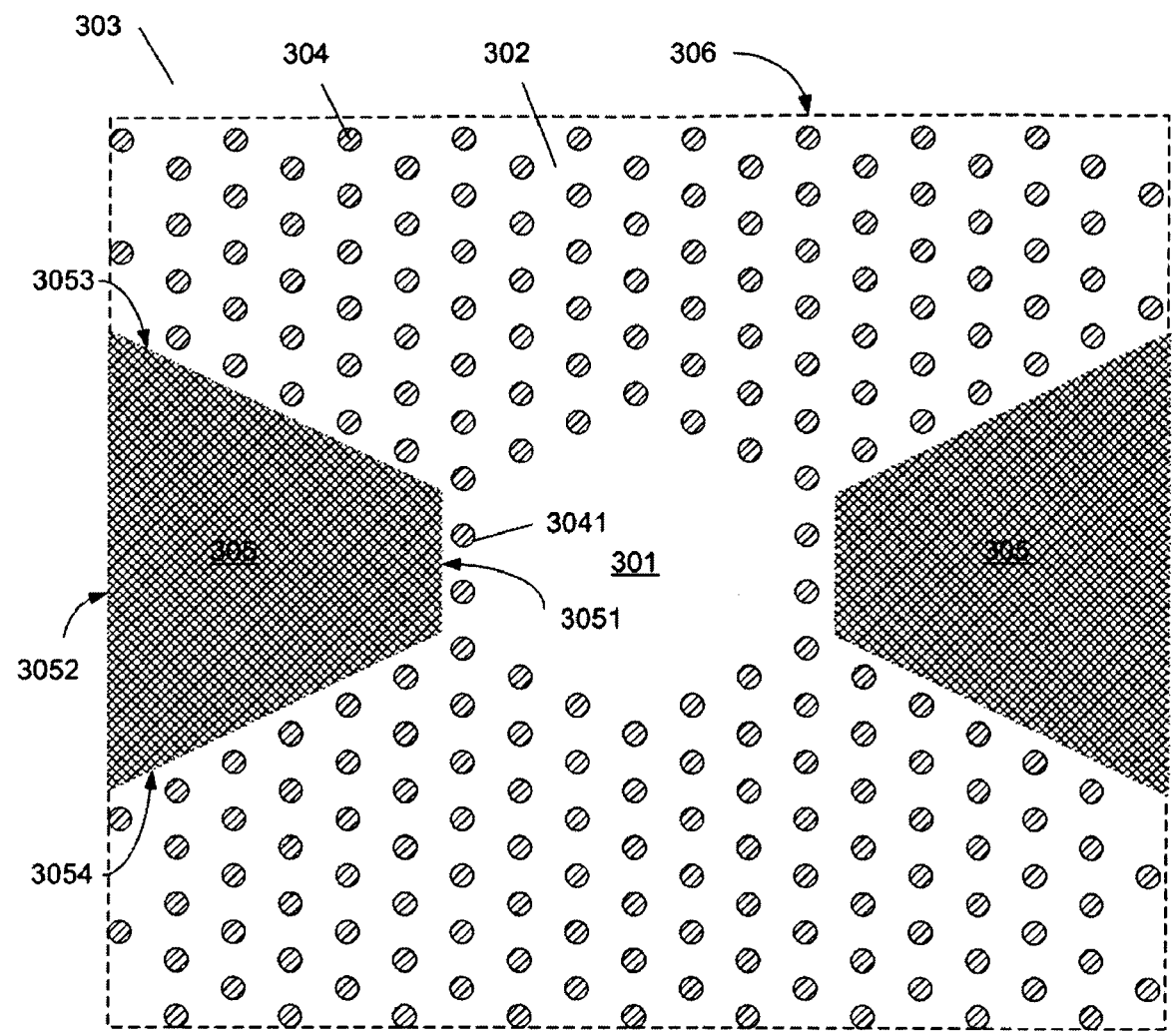
FIG. 30 shows a schematic cross sectional view of a central part of an optical fibre according to the invention wherein two relatively large stress elements are located symmetrically around the core region.

FIGS. 29 and 30 show examples of cross sectional partial views of preferred embodiments of the invention. Common for FIGS. 29 and 30 is that they disclose embodiments of an optical fibre according to the invention comprising a core region 291, 301 surrounded by an inner cladding region 292, 302 comprising micro-structural elements 294, 304 arranged in a regular array (here triangular) and including stress elements 295, 305 (here two substantially identical) arranged symmetrically around the core region in such a way that no micro-structural elements are located on the side 2952, 3052 of the stress elements (or group of stress elements, FIG. 29) facing away from the core region. The embodiments comprise a further cladding region 293, 303 surrounding the inner cladding region and the stress elements. In the embodiments shown, the further cladding region comprises no micro-structural elements. In other embodiments, the solid further cladding may be surrounded by, for example, an air-cladding to provide double cladding fibres. In both embodiments shown, a number of micro-structural elements are located between the core region and the stress elements (or group of stress elements), in FIG. 29, two and in FIG. 30 one micro-structural element, as indicated by reference numerals 2941 and 2942 in FIG. 29 and 3041 in FIG. 30. There may alternatively be, 0, 3, or more than 3 micro-structure elements between the core region and the stress elements (or group of stress elements). The term that 'one or two or three, etc. of the micro-structural elements are located between the stress element and the core region' is intended to mean that in a radial direction from the (geometrical) centre of the core region in a direction towards the part of the boundary of the stress element in question being closest to the core region, the appropriate number of micro-structural elements (one or two or three, etc.) are located between the boundary of the stress element and the boundary of the core region (not necessarily on a straight line but e.g. located within a unit cell crossed by the mentioned radial line, if the micro-structural elements are arranged in a substantially periodic pattern).

In FIG. 29 (and as illustrated in FIG. 29a), a number of individual stress elements 295 (here 16) are grouped together to form a substantially coherent element (i.e. without any micro-structure elements in between, but wherein the stress inducing material of each individual stress element is separated from each other by a (here relatively narrow) bridge of background material, here silica). The number of stress elements in each group may be the same (as in the embodiments shown) or different, thereby providing a design option for tuning the birefringence in the core region. The pitch or centre to centre-distance of the individual stress elements 295 can be different from or (as here) substantially equal to the pitch of the micro-structure elements 294, the latter option thereby facilitating the manufacturing process (where preform capillary tubes and preform stress elements of substantially equal outer dimension can be readily substituted for each other without affecting the neighbouring arrangement of preform elements). It is an advantage that the outer side 2952 of the group of stress elements 295 is essentially free of micro-structure elements (especially voids), thereby facilitating the production and handling of the optical fibre. The individual stress elements comprise a central region of borosilicate and an outer region of silica. Other compositions may of course be envisaged. FIG. 29b is the same fibre wherein the photo is illuminated and taken from the same end of the fibre so that the individual stress elements do not appear directly. The peripheries 2951, 2952 of each of the two groups of stress elements are schematically indicated in FIG. 29b.

FIG. 30 shows a schematic partial cross section of a preferred embodiment comprising a number of (here two) homogeneous stress elements 305 located relatively close to the core region 301 having only a smaller number (here one) of micro-structure elements between the core region 301 and the inner side 3051 of the stress elements 305 (as e.g. counted in a radial direction from the centre of the core region to the centre of the stress element). Advantageously, no micro-structure elements (her voids) 304 are located along the outer side 3052 of the stress elements 305 (the outer boundary of the stress elements 305 being indicated in FIG. 30 by reference numerals 3051, 3052, 3053, 3054). The boundary 306 between the inner 302 and outer 303 cladding regions is e.g. determined by the smallest geometrical form inscribing all micro-structural elements of the inner cladding (here dashed rectangle 306). The core region has a cross-sectional area corresponding to 19 micro-structural elements (1, 6, 12) having been substituted by core rods (of similar outer dimension) in the triangular lattice of the cladding region. The core region could, however, have any other size appropriate for the application in question. The arrangement of stress elements (incl. homogeneous stress elements) with a larger dimension than the pitch of the micro-structure elements may be implemented in several ways, e.g. by including one relatively large preform stress element for each individual stress element 305 in the resulting fibre and stacking these together with the other preform rods and tubes constituting the preform. Alternatively a number of possibly differently sized preform stress elements of the same material may be grouped together to obtain the appropriate form and relative size of each individual stress element 305 in the resulting fibre. Alternatively, a number of preform stress elements, preform rods and/or preform capillary tubes of substantially equal outer dimension are stacked, heated and drawn to a fibre each group of preform stress elements providing a coherent area of stress applying material in the resulting fibre. By the latter method, the preform elements can be readily substituted for each other without affecting the neighbouring arrangement of preform elements, thus providing a flexible scheme for providing virtually any form and distribution of the resulting stress element(s).

The Production Process

Figure 8:
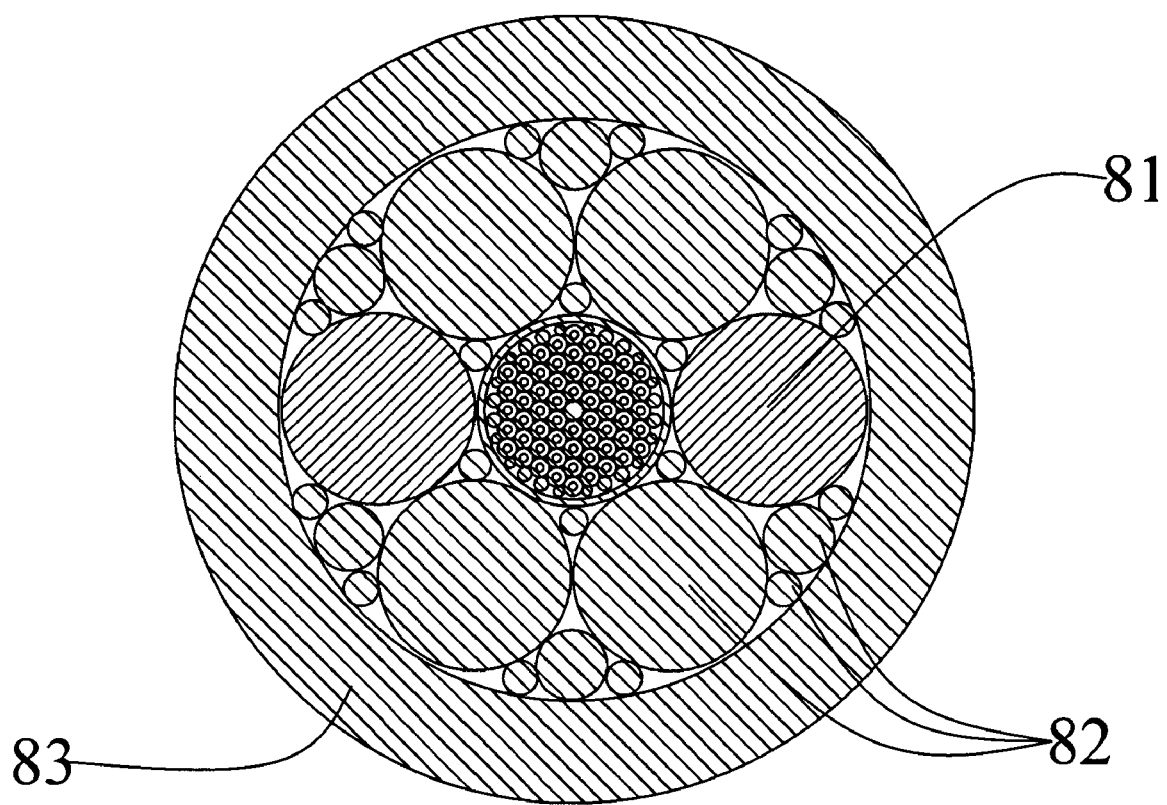
FIG. 8 shows a sketch of a cross section of an embodiment of a preform according to the invention from which fibre is to be drawn, where a pre-drawn centre cane has been used for the core and first cladding region comprising tubular canes for forming micro-structural elements, and a second cladding region comprising solid canes for forming stress elements and background cladding.

FIG. 8 shows one possible realization of the preform, from which a fibre is drawn. The preform consists of a centre cane 80, SAPs 81, padding rods 82 and an over cladding tube 83. The centre cane 80 is fabricated using the stack-and-pull technique and forms the core and inner cladding regions of the final fibre. The centre cane 80 is stacked inside the over cladding tube 83, together with the SAPs 81, and a suitable selection of padding rods 82, in order to minimize the air-filling fraction of the preform. The fibre in FIG. 2 is an example of a fibre realized using such or equivalent preform.

Figure 9:
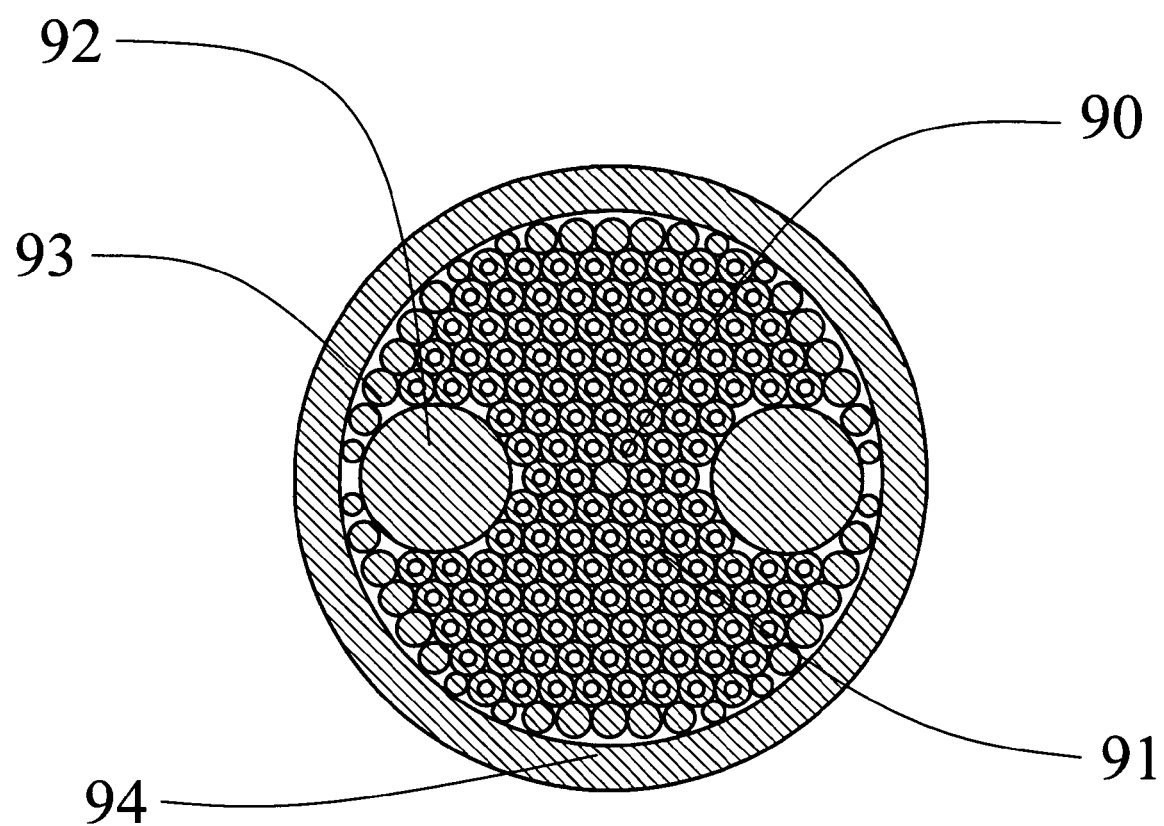
FIG. 9 shows a sketch of a cross section of an embodiment of a preform according to the invention from which fibre is to be drawn, where the whole structure is stacked using glass rods, capillary tubes, stress applying parts and an over cladding tube.

In FIG. 9 another possible realization of the preform is shown. The preform consists of longitudinal preform elements in the form of a core rod 90, a triangular structure of capillary tubes 91, SAP elements 92, padding rods 93 and an over cladding tube 94. All elements 90, 91, 92 and 93 are stacked directly in the over cladding tube 94.

The preform sketched in FIG. 8 is well suited for fibres where the SAP diameter is similar to the diameter of the centre cane, $d_{SAP} \approx 2r_1$ (cf. the terms of FIG. 1). The preform sketched in FIG. 9 allows a smaller spacing of the SAPs, such that $2r_1 < d_{SAP}$, which is advantageous in order to increase the birefringence. Furthermore the preform in FIG. 9 allows the cladding structure to extend around the SAPs (e.g. to include embodiments where one or more SAPs is surrounded by micro-structural elements).

Figure 13A:
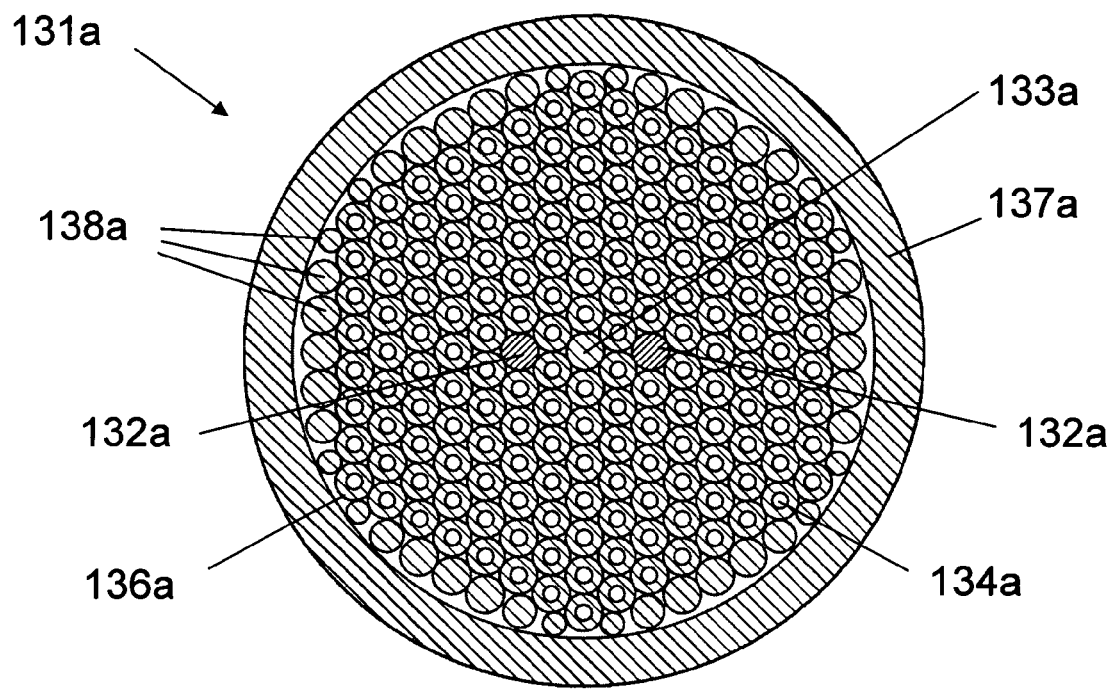
FIG. 13 shows a schematic cross section of, respectively, a preform for manufacturing a photonic crystal fibre according to the invention (FIG. 13A), and the resulting photonic crystal fibre (FIG. 13B) drawn from the preform, wherein 2 stress elements of a size comparable to the size of the holes or voids of a cladding region are located in the cladding region relatively close to the solid core.
Figure 13B:
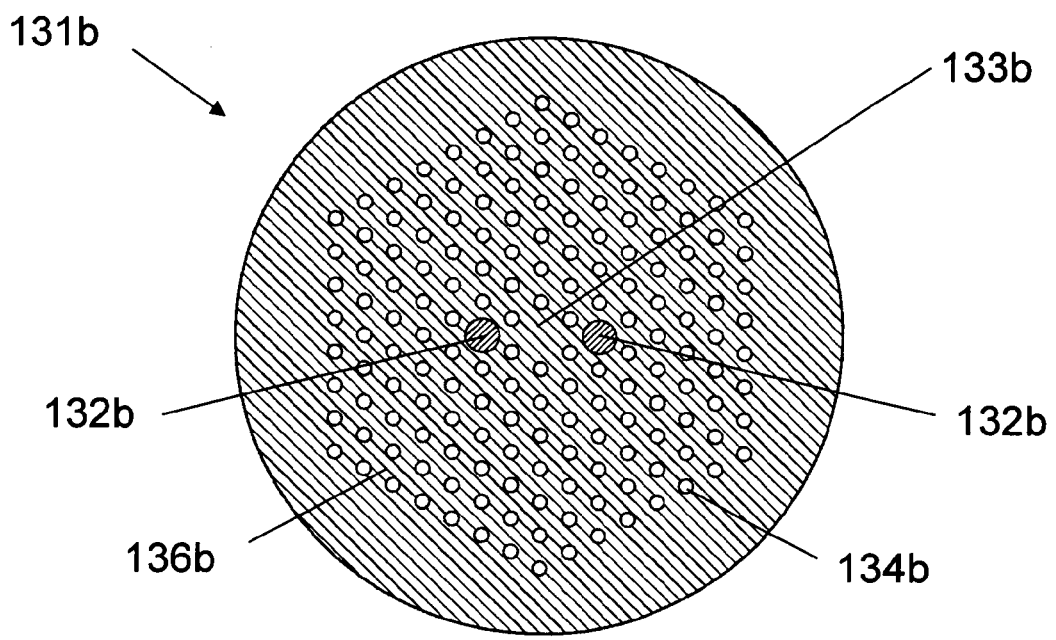

FIG. 13 shows a schematic cross section of, respectively, a preform 131a for manufacturing a photonic crystal fibre according to the invention (FIG. 13A), and the resulting photonic crystal fibre 131b (FIG. 13B) drawn from the preform 131a, wherein 2 stress elements 132b of a size comparable to the size of the holes or voids 134b located in the cladding region 136b relatively close to the solid core region 133b. The preform assembly 131a shown in FIG. 13A allows the use of SAPs 132b in the resulting fibre 131b which have a dimension $d_{SAP}$ which is similar to a minimum centre to centre distance $\Lambda$ between two neighbouring micro-structural elements 134b. The size difference ($d_{SAP} - d_{mse}$) between the holes 134b and the stress elements 132b of the drawn photonic crystal fibre may be controlled by varying the inner diameter $D_{mse}$ of the capillary preform cladding elements 134a. A capillary preform cladding element 134a comprises a rod of a basis material 136a having a typically centrally located void. The basis material 136a of the capillary preform cladding element 134a constitutes (or forms part of) the background cladding material 136b of the drawn fibre 131b. In the embodiment of the preform 131a of FIG. 13A the outer diameter $D_{SAP}$ of the stress elements 132a is substantially equal to the outer diameter of the preform cladding elements 134a and the preform core element 133a. The preform core, cladding and stress elements 133a, 134a and 132a, respectively, are enclosed in a preform overcladding tube 137a. Unfilled space along the periphery of the overcladding tube 137a is filled by preform buffering elements 138a.

Figure 25A:
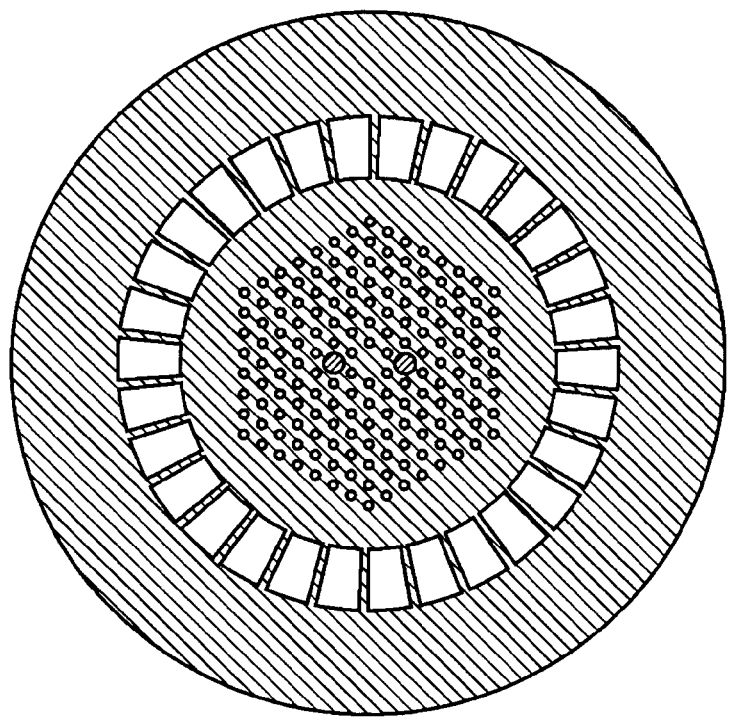
FIG. 25A illustrating an embodiment with relatively small core and two stress elements located symmetrically around the centre of the core, and FIG. 25B illustrating an embodiment with a relatively larger core and sixteen stress elements located mirror symmetrically in two groups around the centre of the core with eight in each group on each side.

Another preferred embodiment of the present invention is shown in FIG. 25A. In this design the structure shown in FIG. 13 is surrounded by an air-cladding and an outer cladding region, to form a double-cladding fibre. The advantage of replacing some of the holes of the inner cladding with SAPs is that for a fixed core size a smaller inner cladding diameter may be realized compared to the design shown in FIG. 7. Consequently, a higher pump absorption coefficient may be obtained for the design in FIG. 25A compared to the design in FIG. 7.

In another embodiment of the invention shown in FIG. 25A, the core region is formed by replacing more than one air void in the cladding with doped silica material, such as three air voids or such as seven air voids.

Figure 25B:
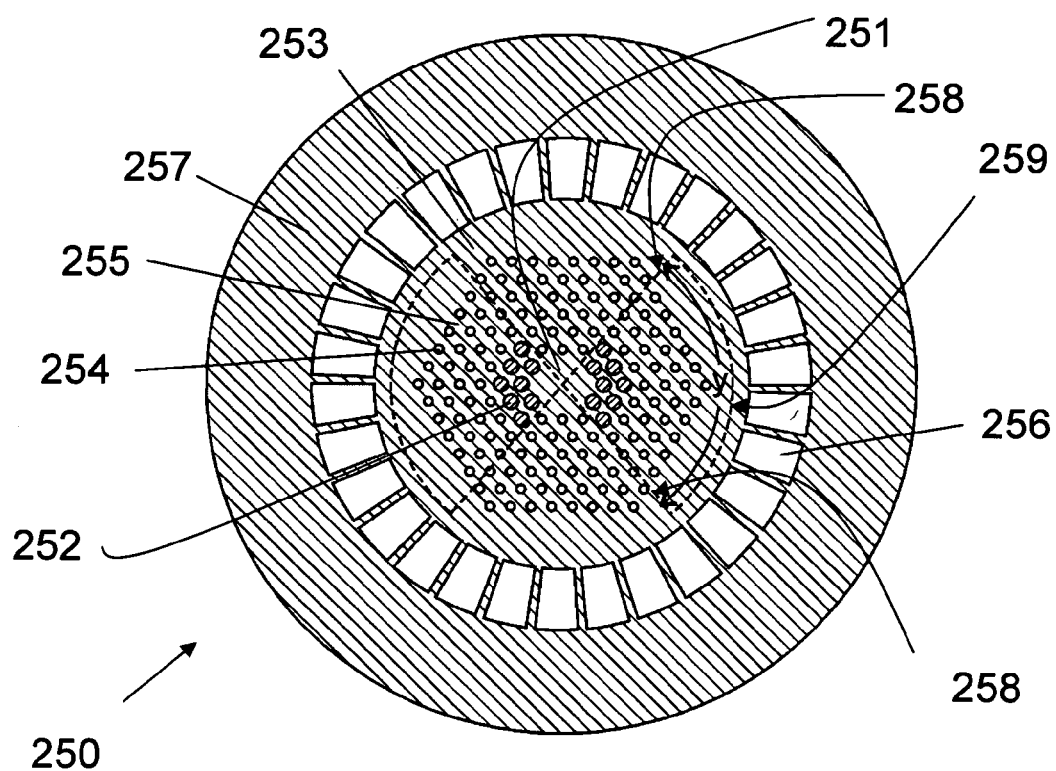
FIG. 25 shows a schematic representation of a cross section of a preferred embodiment of a photonic crystal fibre according to the invention, the fibre being a multi cladding fibre, where a core region, surrounded by a first cladding region comprising micro-structural elements where two air voids are replaced by stress elements is surrounded by an intermediate air cladding region, which again is surrounded by an outer cladding region.

In another embodiment of the invention shown in FIG. 25A, the birefringence is induced by replacing more than two air voids with stress applying material (in the form of individual stress elements), such as six air voids or such as sixteen air voids or such as forty eight air voids. Preferably, the stress elements should be placed in a mirror symmetric way, e.g. in a two-fold symmetry around the centre of the core and as close to the core as possible (as shown in FIGS. 25A and 25B). If the stress elements are placed in a two-fold symmetry around the core it is possible to draw two mirror symmetric wedges (indicated by lines 258 in FIG. 25B) that contain all stress elements 252 and has a common top point in the centre of the core 251. The smallest opening angle y of the wedges (cf. 259 in FIG. 25B) should preferably not exceed 90 degrees; otherwise some of the stress elements 252 partly cancel the effect of the others on the birefringence.

In FIG. 25B, another embodiment of an air clad 256 photonic crystal fibre 250 according to the invention is shown, where the core 251 is formed by replacing seven air voids with doped silica material and the birefringence is obtained by replacing eight air voids symmetrically located on each side of the core with stress elements 252 (cf. the discussion of preform formation above). The inner cladding comprises a first inner cladding region comprising a first background cladding material 255 in which the micro-structural features (here voids) 254 and the stress elements 252 are dispersed in a regular pattern. The inner cladding further comprises a second inner cladding region surrounding the first inner cladding region and comprising a second background cladding material 253. The second background cladding material 253 may be equal to or different from first the background cladding material 255. Around the air-cladding 256, an outer cladding 257 is indicated.

Figure 14A:
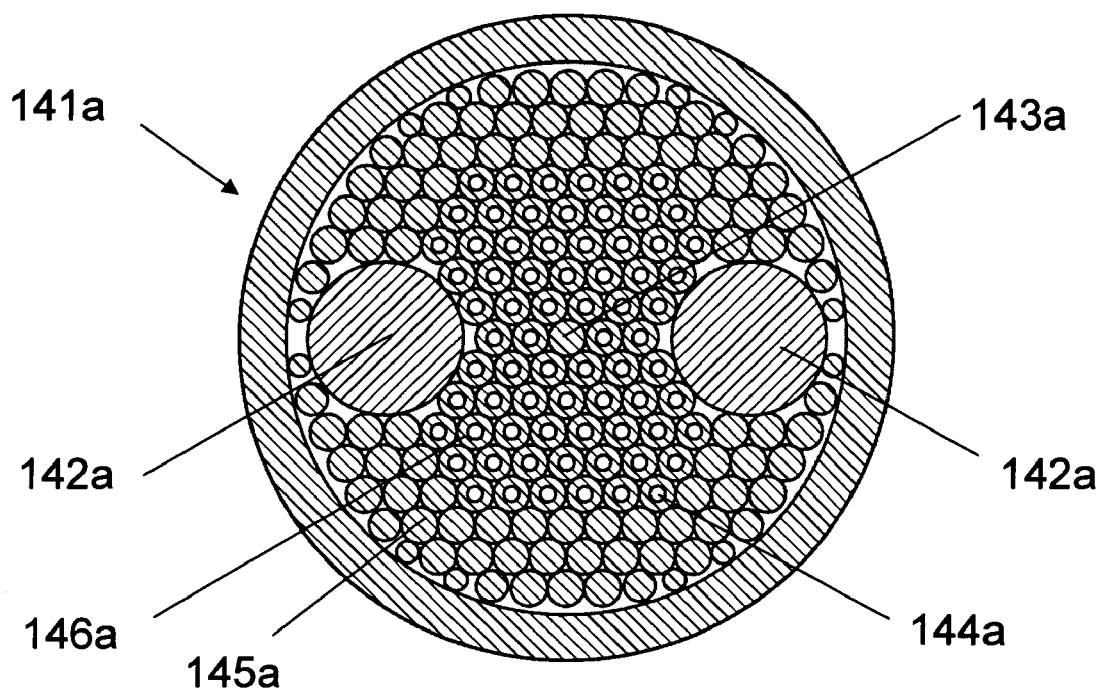
FIG. 14 shows a schematic cross section of, respectively, a preform for manufacturing a photonic crystal fibre according to the invention (FIG. 14A), and the resulting photonic crystal fibre (FIG. 14B) drawn from the preform, wherein 2 stress elements are located partly in a first cladding region comprising micro-structured holes or voids and partly in a second cladding region.
Figure 14B:
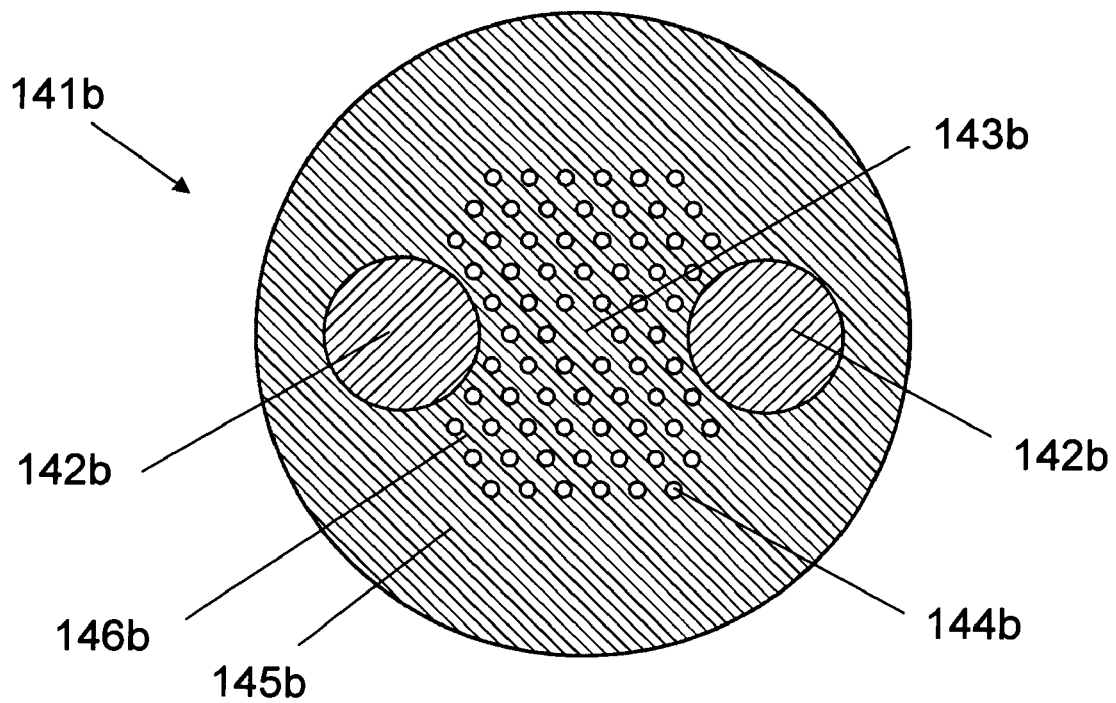

FIG. 14 shows a schematic cross section of, respectively, a preform 141a for manufacturing a photonic crystal fibre according to the invention (FIG. 14A), and the resulting photonic crystal fibre 141b (FIG. 14B) drawn from the preform 141a, wherein 2 stress elements 142b are located partly in a first cladding region 146b comprising micro-structured holes or voids 144b and partly in a second cladding region 145b. Such a design decreases the number of air holes or voids 144b in the cladding region, compared to a fibre 131b drawn from the preform 131a as shown in FIG. 13 where the SAPs 132b are located within the cladding region 136b of the resulting fibre. Reducing the number of air holes or void is advantageous e.g. in a double-cladding fibre design, in order to increase the overlap between the pump light and the guided modes in the inner cladding.

Various aspects of manufacturing a photonic crystal fibre including the preparation of a preform are discussed in chapter 4 in [Bjarklev et al.].

The invention is defined by the features of the independent claim(s). Preferred embodiments are defined in the dependent claims.

Some preferred embodiments have been shown in the foregoing, but it should be stressed that the invention is not limited to these, but may be embodied in other ways within the subject-matter defined in the following claims.

The invention claimed is:

1. A photonic crystal fibre comprising a core region for propagating light in a longitudinal direction of said photonic crystal fibre, a cladding region surrounding said core region, said cladding region comprising micro-structural elements extending in said longitudinal direction and having a first coefficient of thermal expansion, wherein said cladding region further comprises at least one stress element having a second coefficient of thermal expansion different from the first coefficient of thermal expansion and extending in said longitudinal direction of said photonic crystal fibre, said at least one stress element being located in a cladding background material having a third coefficient of thermal expansion different from the second coefficient of thermal expansion, wherein said core region has a centre when viewed in a cross section perpendicular to said longitudinal direction of the photonic crystal fibre, termed a transversal cross section, and at least one of said micro-structural elements is located between said at least one stress element and said centre of said core region, and wherein said location of said at least one stress element relative to said core region and said micro-structural elements and said second and third coefficients of thermal expansion are adapted to provide a stress induced birefringence in said core region of said photonic crystal fibre.

2. A photonic crystal fibre according to claim 1 wherein said core region has more than two-fold symmetry.

3. A photonic crystal fibre according to claim 1 wherein said core region has a constant refractive index $n_{core}$ or a constant effective refractive index $n_{eff,core}$ and said cladding background material has a refractive index $n_{cladback}$, and wherein $n_{core}$ is essentially equal to $n_{cladback}$ or $n_{eff,core}$ is essentially equal to $n_{cladback}$.

4. A photonic crystal fibre according to claim 1 wherein said core region is homogeneous and made of a single material with refractive index $n_{core}$.

5. A photonic crystal fibre according to claim 1 wherein said at least one stress element is solid.

6. A photonic crystal fibre according claim 1 wherein at least one stress element has a refractive index $n_{SAP}$ that is smaller than the refractive index $n_{cladback}$ of said cladding background material.

7. A photonic crystal fibre according to claim 1 wherein said at least one stress element has a maximum cross sectional dimension $d_{SAP}$ essentially equal to a minimum centre-to-centre distance $\Lambda$ between two neighbouring micro-structural elements.

8. A photonic crystal fibre according to claim 1 wherein a maximum dimension $d_{SAP}$ of said at least one stress element is larger than or equal to a maximum dimension $d_{mse}$ of one of said micro-structural elements, $d_{mse}$ being the inner dimension of a hole or void.

9. A photonic crystal fibre according to claim 1 wherein a maximum dimension $d_{mse}$ of one of said micro-structural elements, a minimum distance $\Lambda$ between two neighbouring micro-structural elements, and said third and second coefficients of thermal expansion of said cladding background material and said stress elements, respectively, are adapted to provide no cut-off.

10. A photonic crystal fibre according to claim 1 comprising two groups of stress elements arranged mirror-symmetrically around a line through the centre of the core region when viewed in a transversal cross section of the photonic crystal fibre.

11. A photonic crystal fibre according to claim 10 wherein said groups of stress elements are arranged relative to each other so that two straight lines through the centre of said core region dividing a transversal cross section of the photonic crystal fibre in four fields and each line touching the outline of at least one stress element of each group thereby enclose said two groups of stress elements in opposite fields and define an enclosing centre angle y wherein y is smaller than or equal to 130°.

12. A photonic crystal fibre according to claim 1 adapted to guide a fundamental mode of light at a predetermined wavelength wherein the difference $\Delta n$ between the effective refractive index $n_{mode}$ of said fundamental mode and the effective refractive index $n_{eff}$ of the cladding region is adapted to be smaller than or substantially equal to the modal birefringence $B_{mode}$ of the core region thereby providing a single polarizing bandwidth $\Delta\lambda$ wherein only one of the fundamental polarization states is guided.

13. A photonic crystal fibre according to claim 12 wherein the size of the single polarizing bandwidth $\Delta\lambda$ and/or its centre wavelength $\lambda_c$ is controlled by controlling a parameter selected from the group of parameters comprising the difference between the second and third coefficients of thermal expansion of said at least one stress element and said cladding background material, respectively, the minimum distance $\Lambda$ between two neighbouring micro-structural elements, the relative size of the micro-structural elements $d/\Lambda$, wherein d is the diameter of said micro-structural elements, the difference between the core $n_{core}$ and cladding background $n_{cladback}$ refractive indices, the bending radius of the photonic crystal fibre, and combinations thereof.

14. A photonic crystal fibre according to claim 1 wherein said at least one stress element is located in the cladding region adjacent to the core region and having its centre at a location in the cladding where a micro-structural element would or could otherwise have been located when viewed in a cross section perpendicular to a longitudinal direction of the fibre.

15. A photonic crystal fibre according to claim 1 wherein said at least one stress element when viewed in a cross section perpendicular to the longitudinal direction of the fibre has an inner side substantially facing said core region and an outer side substantially facing away from said core region and wherein the micro-structural elements are arranged in such a way that no micro-structural elements are located along the outer side of said stress element.

16. A photonic crystal fibre according to claim 15 wherein said at least one stress element when viewed in a cross section perpendicular to the longitudinal direction of the fibre appears as one homogeneous element.

17. A photonic crystal fibre comprising a core region for propagating light in a longitudinal direction of said photonic crystal fibre, a cladding region surrounding said core region, said cladding region comprising micro-structural elements extending in said longitudinal direction and having a first coefficient of thermal expansion, wherein said cladding region further comprises at least one stress element having a second coefficient of thermal expansion different from the first coefficient of thermal expansion and extending in said longitudinal direction of said photonic crystal fibre, said at least one stress element being located in a cladding background material having a third coefficient of thermal expansion different from the second coefficient of thermal expansion, wherein at least one stress element is located adjacent to said core region and wherein said location of said at least one stress element relative to said core region and said micro-structural elements and said second and third coefficients of thermal expansion are adapted to provide a stress induced birefringence in said core region of said photonic crystal fibre.

18. A photonic crystal fibre comprising a core region for propagating light in a longitudinal direction of said photonic crystal fibre, a cladding region surrounding said core region, said cladding region comprising micro-structural elements extending in said longitudinal direction and having a first effective refractive index and a first coefficient of thermal expansion, wherein said cladding region further comprises at least one stress element having a second coefficient of thermal expansion different from the first coefficient of thermal expansion and extending in said longitudinal direction of said photonic crystal fibre, said at least one stress element being located in a cladding background material having a third coefficient of thermal expansion different from the second coefficient of thermal expansion and wherein said location of said at least one stress element relative to said core region and said micro-structural elements and said second and third coefficients of thermal expansion are adapted to provide a stress induced birefringence in said core region of said photonic crystal fibre, said photonic crystal fibre being adapted to guide a fundamental mode of light at a predetermined wavelength with a second effective refractive index and the core region has a modal birefringence wherein the difference between the second effective refractive index of said fundamental mode and the first effective refractive index of the cladding region is adapted to be smaller than or substantially equal to the modal birefringence of the core region thereby providing a single polarizing bandwidth located around a centre wavelength wherein only one of the fundamental polarization states is guided.

19. A preform for fabricating a photonic crystal fibre according to claim 1, the preform comprising stacked longitudinal preform elements, said preform elements comprising at least one preform core element, a number of preform cladding elements, at least one preform stress element, and optionally a preform overcladding tube, and wherein said preform core element, said preform cladding elements and said at least one preform stress element are stacked and optionally placed in said preform overcladding tube.

20. An article comprising a photonic crystal fibre according to claim 1 in the form of a fibre amplifier or a fibre laser.

21. Use of a photonic crystal fibre according to claim 1 selected from the group comprising a polarization maintaining fibre, a polarization maintaining fibre amplifier, a polarization maintaining fibre laser, a polarizing fibre, polarizing fibre amplifier and a polarizing fibre laser and combinations thereof.

* * * * *